(12) United States Patent
Chen et al.

(10) Patent No.: US 9,208,550 B2
(45) Date of Patent: Dec. 8, 2015

(54) SMART DOCUMENT CAPTURE BASED ON ESTIMATED SCANNED-IMAGE QUALITY

(75) Inventors: Francine Chen, Menlo Park, CA (US); Scott Carter, Los Altos, CA (US); Laurent Denoue, Verona (IT); Jayant Kumar, Hyattsville, MD (US)

(73) Assignee: FUJI XEROX CO., LTD., Tokyo (JP)

( * ) Notice: Subject to any disclaimer, the term of this patent is extended or adjusted under 35 U.S.C. 154(b) by 284 days.

(21) Appl. No.: 13/586,784

(22) Filed: Aug. 15, 2012

(65) Prior Publication Data
US 2014/0050367 A1 Feb. 20, 2014

(51) Int. Cl.
*G06K 9/00* (2006.01)
*G06T 7/00* (2006.01)
*H04N 5/232* (2006.01)

(52) U.S. Cl.
CPC .......... *G06T 7/0002* (2013.01); *H04N 5/23212* (2013.01); *G06T 2207/30168* (2013.01)

(58) Field of Classification Search
CPC .... H04N 5/2258; H04N 3/155; G06T 7/0083; G06T 2207/30144; G06T 2207/30176; G06T 2207/30168
USPC .................................................. 382/112, 103
See application file for complete search history.

(56) References Cited

U.S. PATENT DOCUMENTS

| | | | | |
|---|---|---|---|---|
| 6,798,895 | B1 * | 9/2004 | Takahashi | 382/101 |
| 2003/0021603 | A1 * | 1/2003 | Engel | 396/429 |
| 2005/0213805 | A1 * | 9/2005 | Blake et al. | 382/137 |
| 2005/0219362 | A1 * | 10/2005 | Garoutte | 348/180 |
| 2006/0164682 | A1 * | 7/2006 | Lev | 358/1.15 |
| 2007/0230933 | A1 * | 10/2007 | Sugimoto et al. | 396/61 |
| 2008/0192129 | A1 * | 8/2008 | Walker et al. | 348/231.2 |
| 2009/0244323 | A1 | 10/2009 | Carter et al. | |
| 2009/0290037 | A1 * | 11/2009 | Pore | 348/222.1 |
| 2010/0272314 | A1 * | 10/2010 | Cournoyer et al. | 382/103 |
| 2010/0277603 | A1 * | 11/2010 | Tsai | 348/208.4 |
| 2011/0221955 | A1 * | 9/2011 | Masuda | 348/362 |
| 2011/0261235 | A1 * | 10/2011 | Ishida | 348/241 |
| 2011/0280450 | A1 * | 11/2011 | Nepomniachtchi et al. | 382/112 |
| 2012/0000981 | A1 * | 1/2012 | Meier et al. | 235/454 |
| 2012/0120264 | A1 * | 5/2012 | Lee et al. | 348/208.4 |
| 2012/0207403 | A1 * | 8/2012 | Phelps et al. | 382/275 |
| 2012/0281077 | A1 * | 11/2012 | Canero Morales et al. | 348/61 |
| 2012/0329516 | A1 * | 12/2012 | Prentice et al. | 455/556.1 |
| 2013/0294652 | A1 * | 11/2013 | Fan et al. | 382/105 |
| 2013/0308002 | A1 * | 11/2013 | Jiang et al. | 348/208.6 |

OTHER PUBLICATIONS

White, S., et al., "EasySnap: Real-time Audio Feedback for Blind Photography", In Adjunct Proceedings of the ACM Symposium on User Interface Software and Technology, 2010, pp. 409-410, Oct. 2010.*

R. Ferzli and L. Karam. A no-reference objective image sharpness metric based on the notion of just noticeable blur (JNB). IEEE Transactions on Image Processing, 18:717-728, Mar. 2009.

(Continued)

*Primary Examiner* — Samir Ahmed
*Assistant Examiner* — Shaghayegh Azima
(74) *Attorney, Agent, or Firm* — Sughrue Mion, PLLC

(57) ABSTRACT

A method for providing real-time feedback of an estimated quality of a captured final image, the method including obtaining a preliminary image, calculating a quality score of the preliminary image, and in response to the quality score of the preliminary image exceeding a threshold quality value, taking a first action.

21 Claims, 16 Drawing Sheets

(56) References Cited

OTHER PUBLICATIONS

Jayant, C., et al., Supporting Blind Photography in Proceedings of the 13th International ACM SIGACCESS Conference on Computers and Accessibility, Oct. 2011.

Kumar, J. et al., Handwritten Arabic Text Line Segmentation using Affinity Propagation:, Document Analysis Systems 2010, pp. 135-142, Jun. 2010.

Marziliano, P., et al., A no-reference perceptual blur metric:, International Conference on Image Processing, vol. 3, pp. 57-60, 2002.

Vazquez, M. et al., Facilitating photographic documentation of accessibility in street scenes:, Extended Abstracts of the SIGCHI Conference on Human Factors in Computing Systems, 2011, pp. 1711-1716, May 2011.

ZXing barcode library. http://code.google.com/p/zxing/, accessed on Aug. 14, 2012.

http://itunes.apple.com/us/app/camscanner/id388624839?mt=8, accessed on Aug. 14, 2012.

http://creativeoverflow.net/camcard-application-review/, accessed on Aug. 14, 2012.

How to Use the Whiteboard Feature on Casio Exilim 10.1 Megapixel Camera. eHow. http://goo.gl/a8X1e, accessed on Aug. 14, 2012.

Casio EX-S10 Review. http://www.steves-digicams.com/camera-reviews/casio/ex-s10/casio-ex-s10-review-3.html, accessed on Aug. 14, 2012.

ClearCam. http://itunes.apple.com/us/app/clearcam/id364930963?mt=8, accessed on Aug. 14, 2012.

JotNot. http://itunes.apple.com/us/app/jotnot-scanner-pro/id307868751?mt=8, accessed on Aug. 14, 2012.

Batten, C., "Autofocusing and Astigmatism Correction in the Scanning Electron Microscope", Dissertation University of Cambridge, Aug. 2000.

Chung, Y., et al., "A Non-Parametric Blur Measure Based on Edge Analysis for Image Processing Applications", Proceedings of the 2004 IEEE Conference on Cybernetics and Intelligent Systems Singapore, Dec. 1-3, 2004, pp. 356-360.

Narvekar, N., et al."An Improved No-Reference Sharpness Metric Based on the Probability of Blur Detection", International Workshop on Video Processing and Quality Metrics for Consumer Electronics (VPQM), Jan. 2010, http://www.vpqm.org.

Carter, S., "NudgeCam: Toward targeted, higher quality media capture", Proc. of ACM MM, pp. 615-618, Oct. 2010.

Yu, Y., et al., "A User Study of Visual versus Sonically-enhanced Interfaces for Use while Walking", Proc. of ACM MM'10, pp. 687-680, Oct. 2010.

\* cited by examiner

SMART DOCUMENT CAPTURE BASED ON ESTIMATED SCANNED-IMAGE QUALITY

BACKGROUND

1. Technical Field

Aspects of the example embodiments are directed to document capture, and more specifically, smart document capture by estimating scanned-image quality before scanning.

2. Description of Related Art

People are increasingly using cameras of mobile devices (such as cellular phones and personal digital music players) to attempt to scan physical documents. In these situations, the user captures an image of the physical document the usual way: the user must look at the screen of the mobile device. However, camera quality, uneven lighting conditions, and other contextual issues may result in the quality of document images captured with mobile devices being much lower than expected.

Thus, using a mobile device to capture a high quality image of a physical document can be difficult. For example, even if the user is careful to position the physical document in a preview screen of the mobile device, the quality of the final image may not appear as expected based on the preview screen. Furthermore, the act of capturing an image of the physical document may affect the quality of the image, as explained below.

There are a number of potential causes of lost image quality, which may include:

Focus
  With a small preview screen, it may not be readily apparent when the focus is slightly off of optimal. Further, even if the mobile device has an autofocus function, autofocus may not be consistent or reliable, especially at the close distances between a mobile device and a physical document, when capturing images of a physical document page. Further, even when correctly focused, the autofocus may refocus before an image can be captured. FIG. 14 provides an example of a blurry captured image which may be captured even if a mobile device is equipped with an autofocus function for the various reasons discussed above.
Rotation
  The frame of the mobile device image may be rotated relative to the page, resulting in a lower resolution of the captured image.
Framing
  When the image is captured, part of the desired content may be cropped, or too much extraneous content may be included. Thus, the resolution of the desired content is reduced due to the difficulty of simultaneously ensuring that multiple edges are correctly framed. FIG. 15 provides an example image of a captured image that is not properly framed and that is rotated relative to the page due to the difficulty of simultaneously ensuring that multiple edges are correctly framed.
Shadows and Poor Lighting
  Poor lighting may result in lower image quality. The act of taking the picture may lower the quality of the image, especially if the user leans over the physical document to see the preview screen, thereby casting a shadow on the document. Further, the shadow may not be apparent when looking at the physical documents, but may be exaggerated in the captured image of the document.
Depth Variation
  The image may not be captured with the plane of the mobile device held parallel to the plane of the physical document. Thus, some parts of the captured image of the document may be more in focus than other parts of the captured image of the document. For example, if the user holds the camera to one side, as someone sitting might do when capturing an image of a page of a physical document on their desk, the camera may not be able to bring into focus the different depths at close range.

Some of these issues may be handled using post-processing techniques (i.e. image sharpening techniques, image rotating techniques, image cropping techniques, etc.). However, image information may not be fully captured due to above noted issues and not be recoverable by post-processing or post processing may introduce artifacts. Thus, post-processing techniques cannot fully compensate for the above noted issues.

Thus, low camera quality, uneven lighting conditions, and other contextual issues may affect the quality of a captured image with respect to a preliminary image displayed on the screen of the mobile device, even though the cameras on such mobile devices have increasingly higher resolutions. Thus, existing techniques and apparatuses may not be able to provide accurate scans due to poor quality of captured images.

SUMMARY

This application relates to a method for providing real-time feedback to users about the likely quality of a captured image. The quality measures such as the sharpness and/or framing of a page or of one or more columns from a page may be captured, allowing users to adjust the camera position, and the time (or place) to capture an image a picture of a physical document to produce a high quality result may be determined automatically or provided to a user who can determine when to take the picture based on the feedback. The feedback mechanisms may avoid a need to rely on using the preview screen to judge an imaging being captured, and may permit a user to lean away from the document so as to avoid interference with the captured image.

Aspects of certain example embodiments include a method for providing real-time feedback of an estimated quality of a captured final image, the method including obtaining a preliminary image, calculating a quality score of the preliminary image, and in response to the quality score of the preliminary image exceeding a threshold quality value, taking a first action.

Aspects of certain example embodiments include a computer-readable medium having stored therein executable instructions for providing real-time feedback of an estimated quality of a captured final image, the instructions including obtaining a preliminary image, calculating a quality score of the preliminary image, and in response to the quality score of the preliminary image exceeding a threshold quality value taking a first action.

Aspects of certain example embodiments include an apparatus for providing real-time feedback of an estimated quality of a captured final image, the apparatus including an image capture device that captures a preliminary image, a quality analyzer that calculates at least one quality score of the preliminary image, and a controller that takes a first action in response to the one or more quality score(s) of the preliminary image exceeding a threshold quality value.

BRIEF DESCRIPTION OF THE DRAWINGS

The accompanying drawings, which are incorporated in and constitute a part of this specification, exemplify the example embodiments and, together with the description, serve to explain and illustrate principles. Specifically.

DETAILED DESCRIPTION

In the following detailed description, reference will be made to the accompanying drawing(s), in which identical functional elements are designated with like numerals. The aforementioned accompanying drawings show by way of illustration and not by way of limitation, specific embodiments and implementations consistent with principles of an example embodiment. These implementations are described in sufficient detail to enable those skilled in the art to practice an example embodiment and it is to be understood that other implementations may be utilized and that structural changes and/or substitutions of various elements may be made without departing from the scope and spirit of an example embodiment. The following detailed description is, therefore, not to be construed in a limited sense. Additionally, the various embodiments of the invention as described may be implemented in the form of software running on a general purpose computer, in the form of a specialized hardware, or combination of software and hardware.

In this application, an example method and an example apparatus for providing real-time feedback to users about estimated quality of a to-be-captured image (i.e. an image that has not yet been captured, but may be captured in the future) is described. The quality of the to-be-captured image is estimated based on quality measures of a preliminary image that was previously captured. Examples of the quality measures of the preliminary image may include, but are not limited to, the sharpness and the framing of a page of text or of one or more columns from a page. By providing real-time feedback of quality measures of the preliminary image, the camera position may be adjusted in a manner that may improve quality measures.

In some example embodiments, a secondary, or final image, may be automatically captured when it is determined that the position (and/or timing) of the camera is sufficient to produce an image of sufficient quality for a scanning and/or image recognition operation. Alternatively, in some example embodiments, feedback (such as a visual indicator, or an audible sound or tone) may be provided to a user to indicate that the quality measures are sufficient that the to-be-captured image is estimated to have a sufficient quality, and the user can determine when to capture the image picture based on the feedback.

Figure 1:
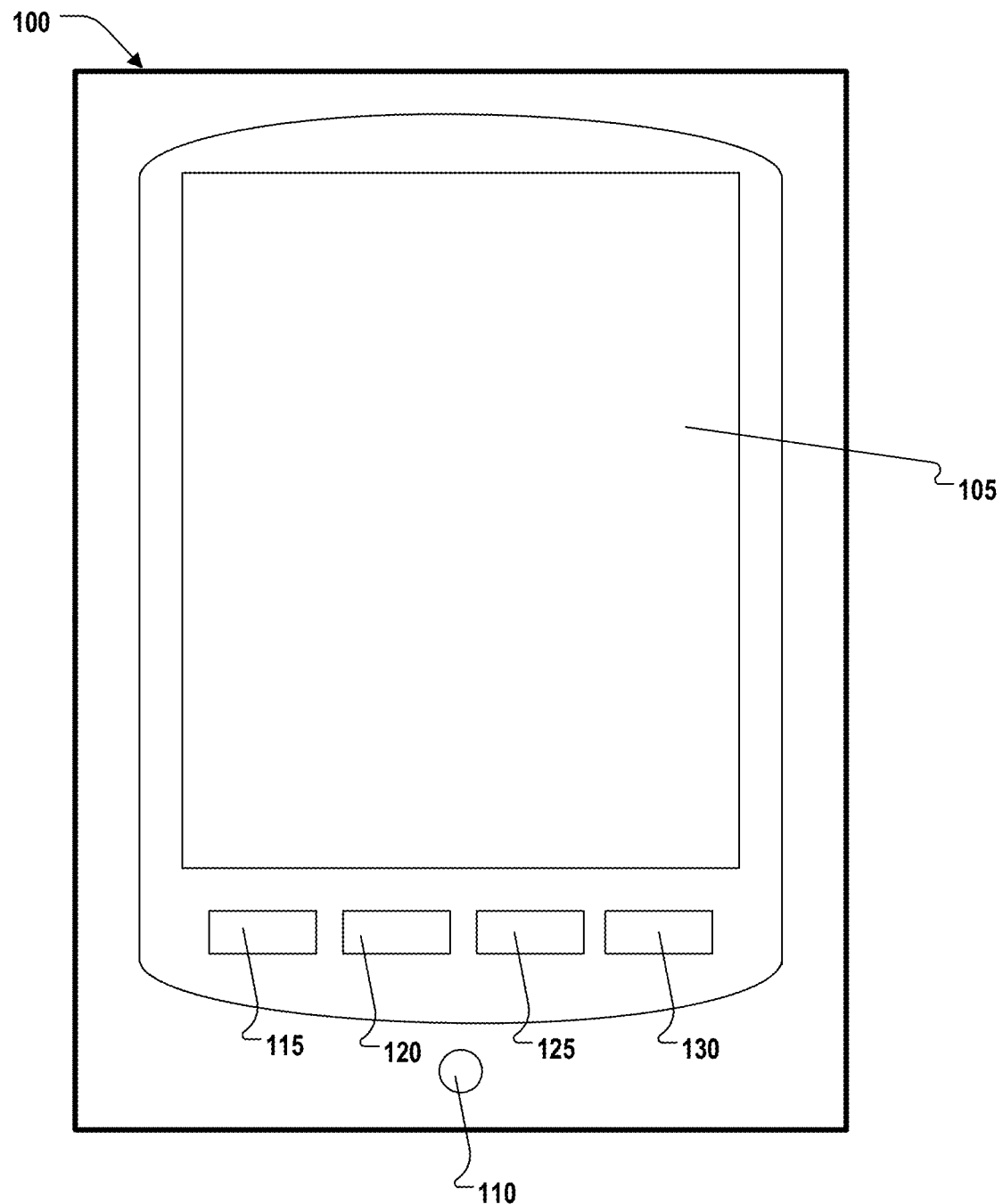
FIG. 1 illustrates an example embodiment of a mobile device that could be used to capture an image in an example embodiment.

FIG. 1 illustrates an example embodiment of a mobile device 100 configured to capture an image. The mobile device 100 includes a display 105 that may display information to a user including a preliminary image and visual feedback regarding image quality. The mobile device 100 may also include a one or more buttons (115, 120, 125, and 130) that could be used by a user to initiate commands and cause operations to be formed by the mobile device. The display 105 may be a touch screen display that could be used by a user to initiate commands and cause operations to be formed by the mobile device in addition to or as an alternative to the buttons (115, 120, 125, and 130). Additionally, the mobile device 100 may also include an LED or light bulb 110 that conveys visual feedback regarding image quality to a user.

An example embodiment may include an application running on the mobile device 100 which may provide instruction to capture images of a document with the camera of the mobile device. In such an example embodiment, the application may be running on the mobile device 100 with no external support, the application may only need access to the camera of the mobile device. As the camera views the document, the application may analyze the preview frame using two distinct quality scores (described below). As the quality scores change, the mobile device translates the quality scores into feedback to the user.

Feedback can include audio tones (e.g., sounds) and may also include visual indicators, such as the color or hue of an LED 110 of the mobile device 100 being changed, or a change in the displayed preview image (such as highlighting edges of the preview image to indicate proper framing). For example, lower scores may correspond to low frequency tones and higher scores may correspond to high frequency tones on a continuous or discrete scale, or different tones can be used, as would be apparent to a person of ordinary skill in the art.

Feedback can also be provided by controlling an LED 110 of the mobile device 100 to vary in color or hue based on the scores. For example, lower scores may correspond to the LED 110 being red and higher scores may correspond to the LED 110 being green. The LED 110 may vary on a continuous, or discrete scale, based on scores, or alternative color schemes may be used as would be apparent to a person of ordinary skill in the art.

When the mobile device is capturing an image, depending on the current feedback mode, a distinct audio tone may play. Further, the LED 110 may flash a color outside of the score range (such as blue). Furthermore, the application in some example embodiments may capture the image of the physical document automatically based on the quality scores. Alternatively, the application in some example embodiments may capture the image of the physical document only based on a manual input by a user (such as by pushing a button 115, 120, 125, 130, or touching an icon on a touch screen display 105).

Figure 2:
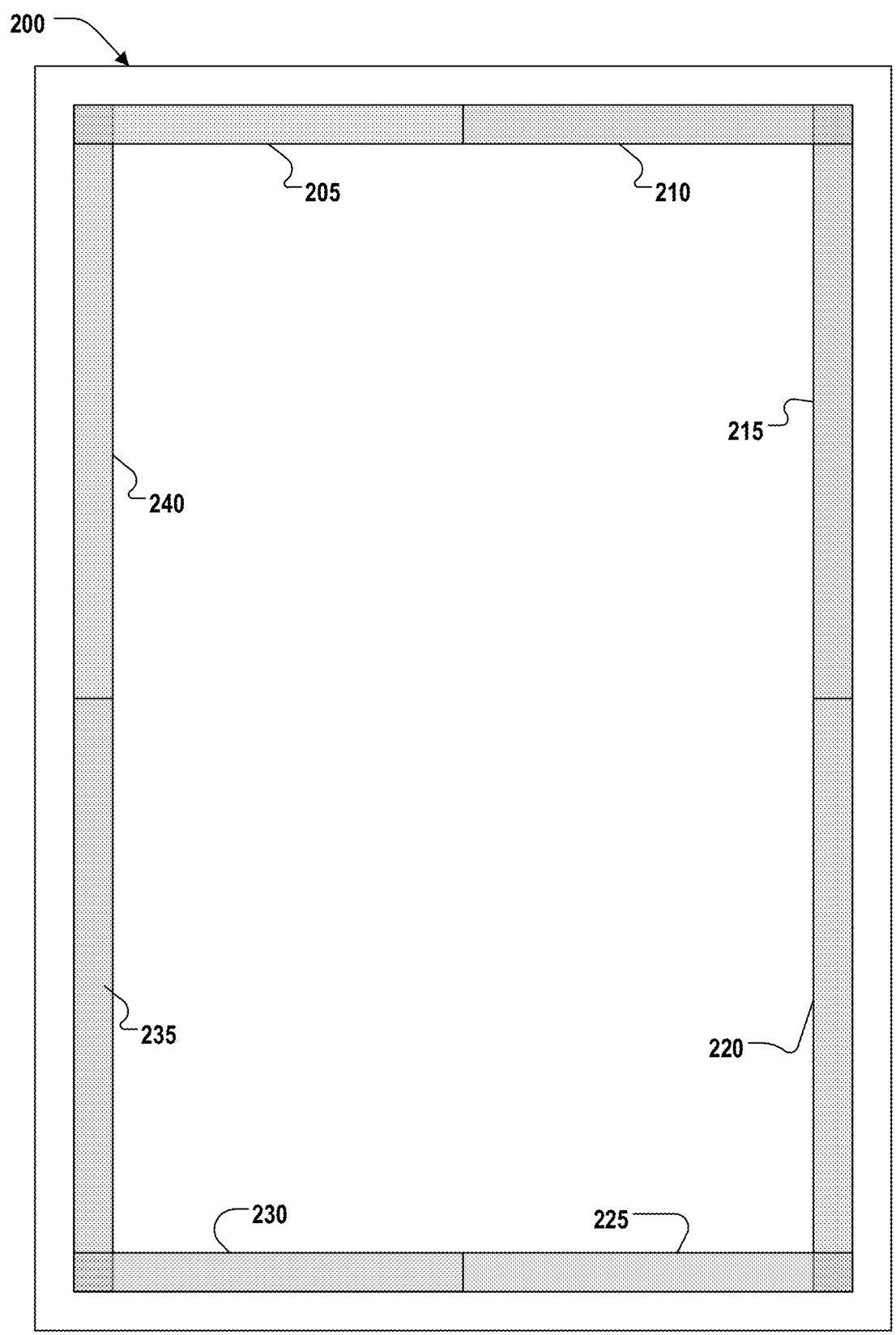
FIG. 2 illustrates quiet margins of an image according to an example embodiment.

FIG. 2 illustrates an example of an allowable range of the inside edge of "quiet margins" (explained below) required for an image to be captured using example embodiments of the processes discussed below. In FIG. 2, an example page 200 is shown with eight zones (205, 210, 215, 220, 225, 230, 235, 240) highlighting eight areas where margins (quiet margins) may be estimated or measured to determine a framing score using the processes discussed in more detail below. "Quiet margins" correspond to the "gutters" between columns of text or the margins between text columns and the edge of the page (i.e. areas of blank space which may surround the text areas on a page). The eight areas include top left 205 and top right 210 zones, upper right side 215 and lower right side 220 zones, bottom left 230 and bottom right 225 zones, and upper left side 240 and lower left side 235 zones. However, quiet margins need not be divided into eight zones and may be divided into more than 8 zones, or may be divided into less than 8 zones, as would be apparent to a person of ordinary skill in the art. Further, the arrangement and orientation of the quiet margins are not limited to shapes or sizes shown in FIG. 2 and may be any shape or size to divide the regions near the edges of a capture image into zones for further analysis as discussed below.

Process Overview

Figure 3:
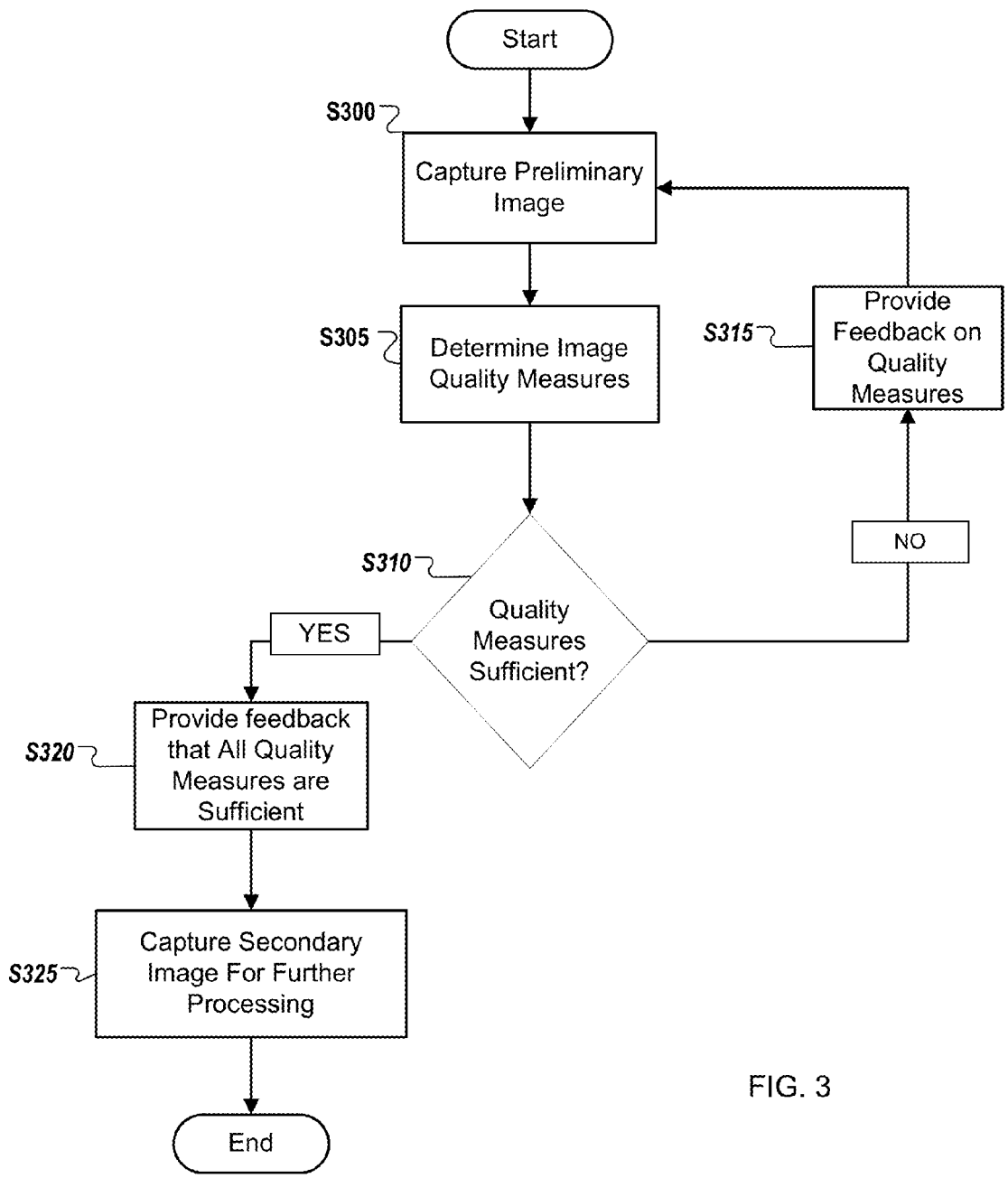
FIG. 3 illustrates a method of capturing an image according to an example embodiment.

FIG. 3 illustrates a method of capturing an image according to an example embodiment. As mentioned above, an example embodiment may include an application running on a mobile device, controlling the camera of the mobile device. However, an example embodiment is not particularly limited to an application running on a mobile device, and may alternatively include software running on a server or any other computing device, in communication with a mobile device or may be embodied as hardware.

As illustrated in FIG. 3, in a method according to an example embodiment, a preliminary image is captured in S300. The method of capture of the preliminary image is not particularly limited and may include capturing an image with a charge-couple device (CCD), capturing an image with an active-pixel sensor (APS), or any other image capture method as would be apparent to a person of ordinary skill in the art. Then one or more image quality measures (e.g. framing scores and/or sharpness scores) of the preliminary image are determined (e.g. obtained and/or calculated) in S305. As discussed below regarding S310 and S315, feedback on the quality measures may be provided, including whether the quality measures are sufficient for an image to be captured. The obtained and/or calculated quality measures are discussed in more detail below.

At S310, the determined image quality measures are evaluated to determine whether the image quality measures are sufficient for image capture (e.g. do the quality measures exceed thresholds for image capture). As discussed in more detail below, one or more quality measures (e.g. sharpness scores and/or framing scores) may be used independently or in combination to identify or address some or all of the document image issues outlined in the background section above. For example, the document sharpness scores may be used to identify focus issues and document framing scores may be used to identify framing issues. Further, document sharpness scores and document framing scores may be used in combination to identify rotation, shadow/lighting, and depth variation issues.

If the quality measures are not high enough, feedback is provided to a user indicating that image quality is not sufficient at S315. As mentioned above, feedback may include audio tones or sounds, and/or visual indicators. Based on the feedback that the quality measures are not sufficient, a user may reposition the mobile device and a new preliminary image may be captured at S300.

Alternatively, if the quality measures are sufficiently high, feedback is provided to a user indicating that image quality is sufficient at S320. If the image quality measures are sufficient, a secondary image (i.e. a final image) may be captured at S325 by receiving a user input (e.g. by pushing a button 115, 120, 125, 130, or touching an icon on a touch screen display 105 on a mobile device 100 of FIG. 1) or alternatively a secondary image (i.e. a final image) may be captured automatically without requiring user input if the quality measures are sufficient.

FIGS. 4-7 discussed below provide examples of methods that could be used to perform S305, S310, S315, and S325 in the process of FIG. 3.

Quality Measures

As discussed above, one or more quality measures may be used to evaluate the quality of the preliminary image. In an example embodiment, both a sharpness score and a framing score (such as a quiet margin size, as discussed below) may be used. Additionally in some example embodiments, an alignment or orientation measure may also be a quality measure used to estimate alignment of text with a camera edge.

However, calculating an alignment or orientation measure may be computationally expensive and thus be difficult for real-time capture by a mobile device. Thus, in example embodiments, image sharpness measures and framing measures (such as quiet margin size) can be used to indirectly provide an indication of text line alignment without needing to calculating alignment or orientation measurements. Thus, combining image sharpness measures and framing measures, text alignment can be indirectly measured.

Another example quality measure may be movement, or more specifically, lack of movement. For example, movement can be estimated from accelerometer readings available in mobile devices. Checking accelerometer readings may be faster than checking computing sharpness, and thus may be a backstop against taking a photo right when the user decides to point the camera someplace else. However, lack of movement alone does not guarantee a sharp image, since blur can be due to other causes, such as the image being out of focus. Thus, multiple quality measures may be combined.

Framing Score-Quiet Margin Estimation

When capturing an image of a page of a physical document, a user captures an image of the entire page or may capture an image of a portion of a column of text on the page of the physical document. When the user is capturing an image of the entire page, the edges of the page may be used to frame a whole page. To frame only a portion of a column a text, the size of the quiet margin may instead be estimated. "Quiet margins" correspond to the "gutters" between columns of text or the margins between text columns and the edge of the page (i.e. areas of blank space which may surround the text areas on a page).

In an example embodiment, a threshold may be set for minimum and maximum quiet margin size. Use of a maximum quiet margin size may ensure that a region of interest fills most of captured image to use more of the available resolution. An example of an allowable range for the inside edge of quiet margins for a page is illustrated are shown by in FIG. 2. In FIG. 2, an example page 200 is shown with eight zones (205, 210, 215, 220, 225, 230, 235, 240) highlighting eight areas where quiet margins could be measured on the example page 200. These areas include top left 205 and top right 210 zones, upper right side 215 and lower right side 220 zones, bottom left 230 and bottom right 225 zones, and upper left side 240 and lower left side 235 zones. However, quiet margins need not be divided into eight zones and may be divided into more than 8 zones, or may be divided into less than 8 zones, as would be apparent to a person of ordinary skill in the art. Further, the arrangement and orientation of the quiet margins are not limited to shapes or sizes shown in FIG. 2 and may be any shape or size to divide the regions near the edges of a capture image into zones for further analysis as discussed below.

In an example embodiment, a page captured in portrait orientation, a minimum left and right quiet margin size may be set at about 2% of the image width and a maximum left and right quiet margin size may be set at about 8% of the image width. The minimum and maximum top and bottom quiet margin sizes may be set to be within similar ranges. These ranges are merely provided for exemplary purposes, and the minimum and maximum quiet margin sizes are not particularly limited to being between about 2% and about 8%.

Figure 8C:
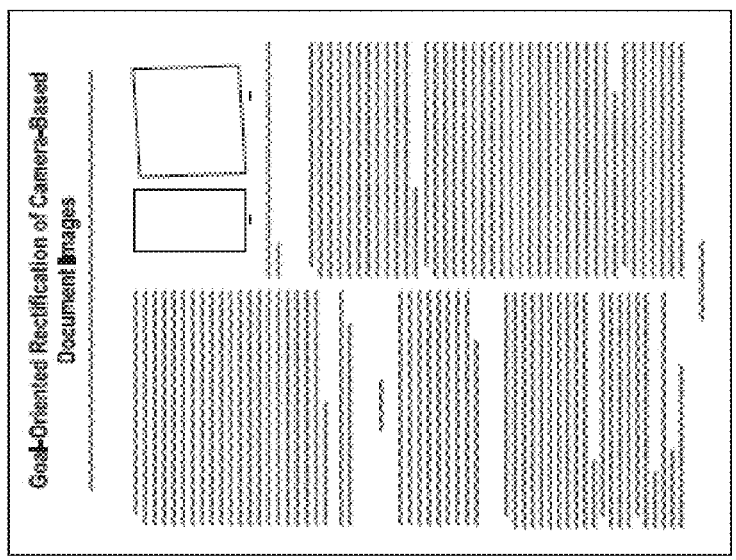
FIG. 8(a)-(c) illustrates various framing conditions that may be acceptable in an example embodiment.
Figure 8B:
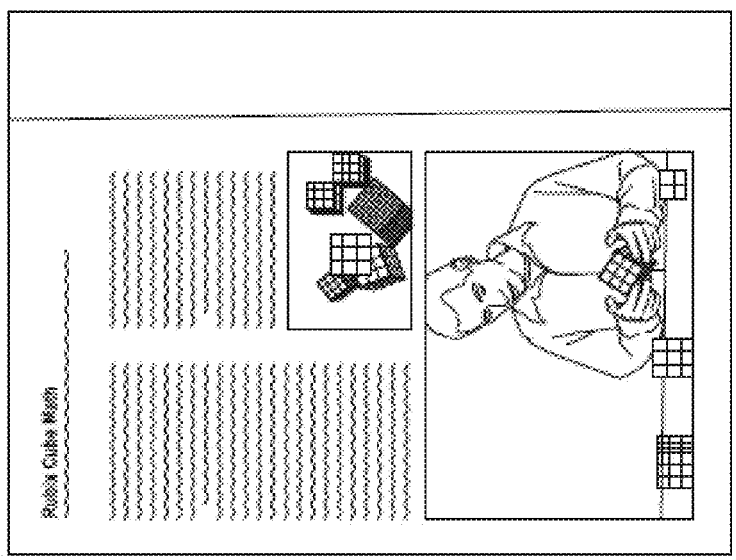
Figure 8A:
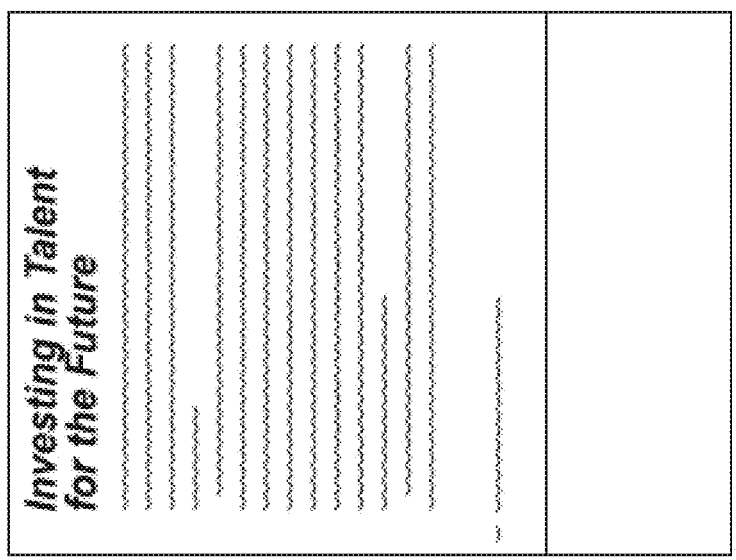

In an example embodiment, the framing score may be determined to be sufficient under one or more of the following circumstances:

a. When the left and right margins meet the quiet margin size constraints (ranges discussed above) and at least one of the top or bottom margins also meets the margin size constraints. This circumstance is shown in FIG. 8(*a*). This circumstance may be used, for example, when a user would like one or more columns to fill the image width. In some example embodiments, the top or bottom of part of a column may be constrained to include only part of a line.

b. When the top and bottom margins meet the quiet margin size constraints (ranges discussed above) and at least one of the left or right margins meets the margin size constraints. This circumstance is shown in FIG. 8(*b*). This circumstance may be used, for example, when a user would like the image height to be filled with a column. In some example embodiments, the left or right edge of a column may be cropped.

If all four margins (top, bottom, left, and right) all meet the quiet margin size constraints (ranges discussed above) a framing score for the image may be determined to be sufficient. This circumstance is shown in FIG. 8(*c*).

There are a number of features that may be used to identify quiet margin size, including pixel values, text character locations, and feature point locations (for example, Scale-Invariant Feature Transform Features (SIFT features may be used). Further, a combination of methods may be used instead of a single method.

Although pages of a physical document to be captured may have a white background, magazines, slides and other documents may have colored backgrounds. Unlike scanned images, images captured using a mobile device may have been taken with the camera positioned so close to the page that no margins or columns are viewed in the captured image, or so far from the page that other irrelevant objects are in view. Furthermore, the lighting may not be carefully controlled, such that different lighting conditions can alter the captured color over different parts of the image.

Thus, in an example embodiment discussed below, a combination of two complementary methods may be used to identify. In this example embodiment, the complementary methods may include: (1) a pixel-based method, which may work on uniform backgrounds and may handle photos, and (2) a character location-based method, which may work on text, and may handle non-uniform backgrounds better than pixel-based, but may not handle photos with gradual color changes as well as a pixel-based method. Each of these example methods are discussed in more detail below.

Pixel-Based Method

Figure 4:
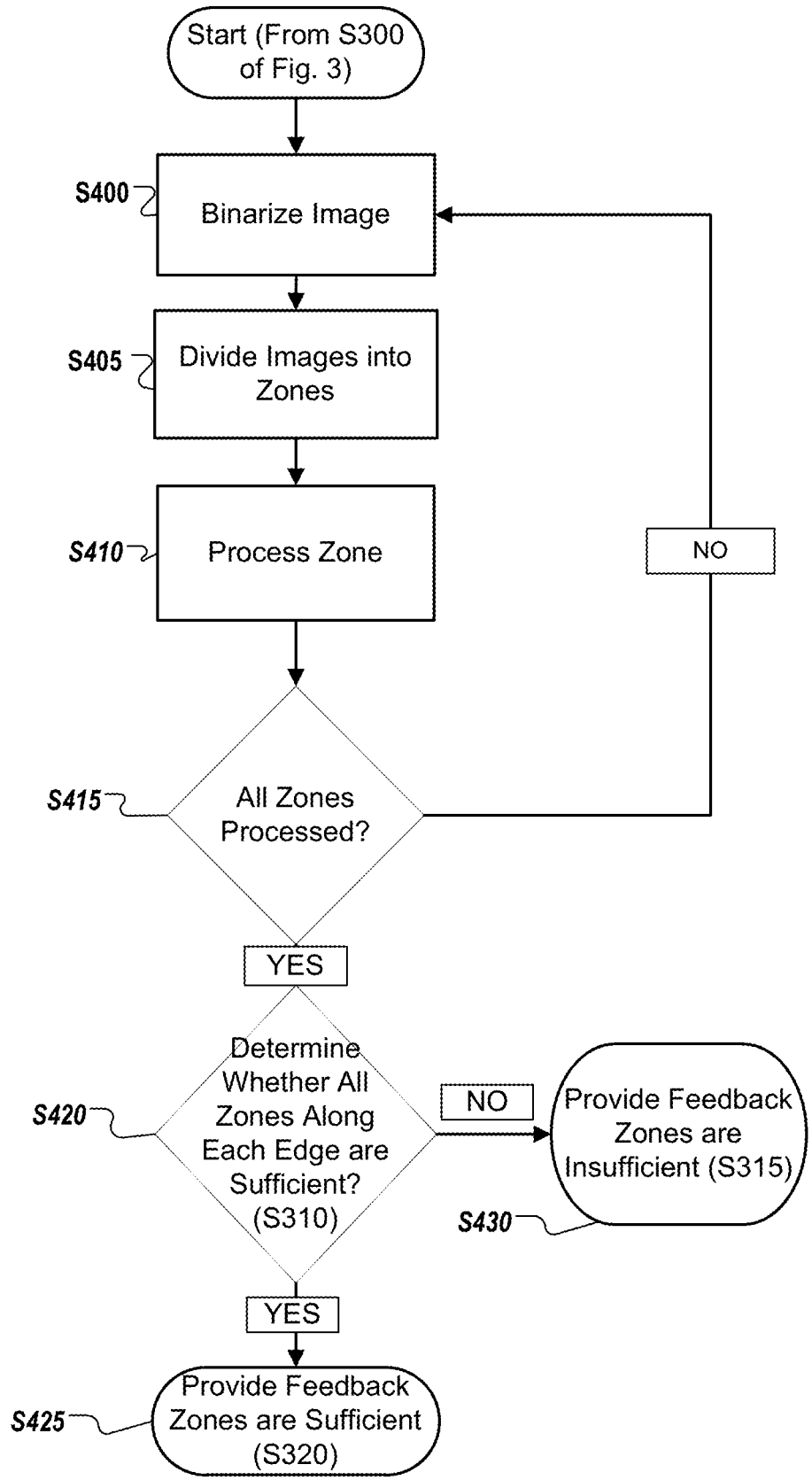
FIG. 4 illustrates a method of processing a whole image using pixel values according to an example embodiment.
Figure 5:
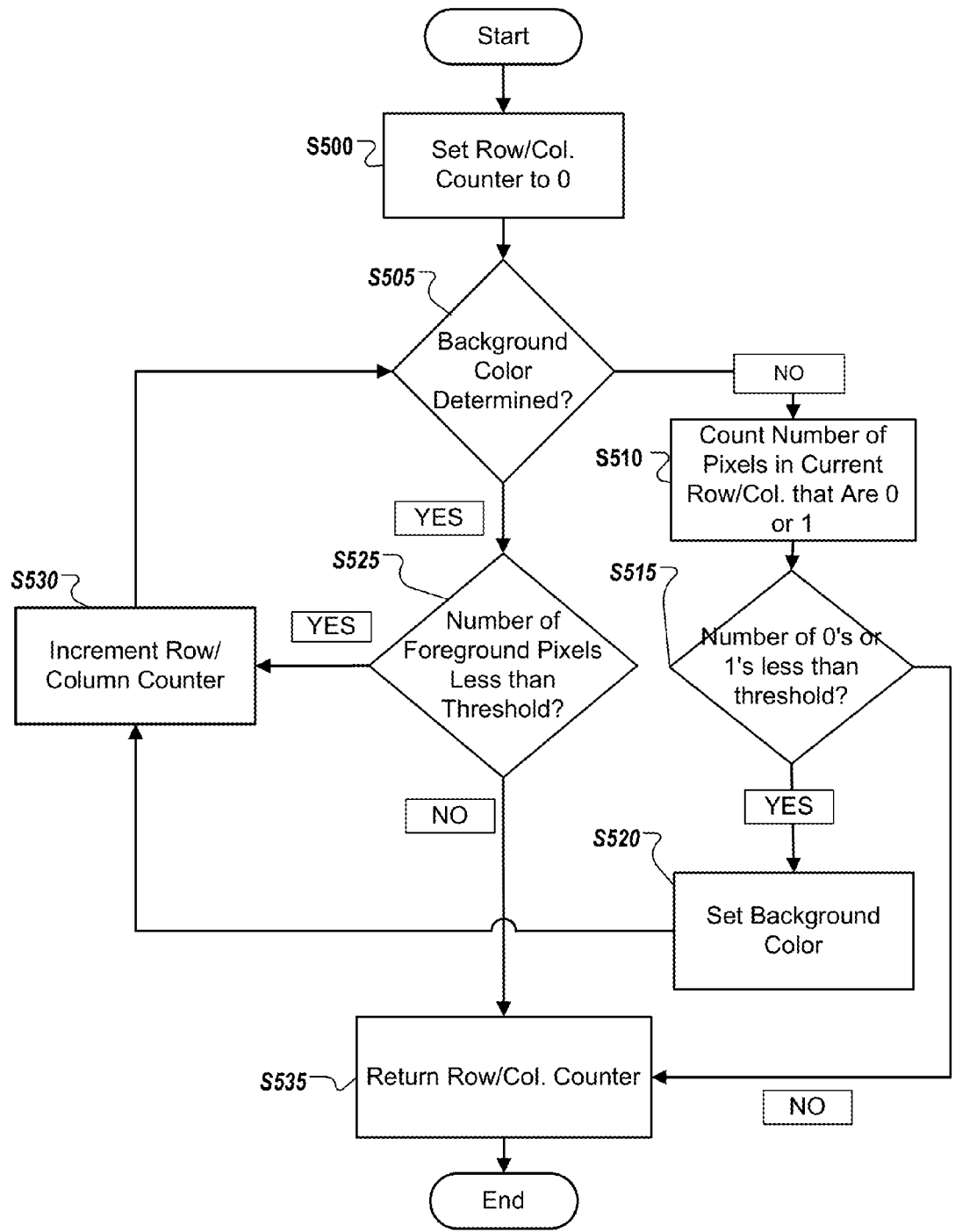
FIG. 5 illustrates a sub-method of processing an individual zone making up a portion of the image in the method of FIG. 4 according to an example embodiment.

Block diagrams illustrating an example method of finding quiet margin sizes using pixel values as features is shown in FIGS. 4 and 5. FIG. 4 illustrates the method for processing the whole image and provides example embodiments of S305, S310, S315 and S320 of the process of FIG. 3. FIG. 5 illustrates a method of processing an individual zone making up a portion of the image in the method of FIG. 4.

To check quiet margins using pixel values, the image is first binarized (i.e. the pixel values are converted to binary format) in S400. Additionally, in some example embodiments, methods of cleaning up or processing an image, such as morphology-based, filtering-based, or edge detection methods, for example, may be applied to the image before, or after the image is binarized. Once the image is binarized, the image is divided into the plurality of zones in S405. Each of the zones is processed to determine whether the quiet margin values are acceptable in S410. By dividing the rows or columns along an edge into a small number of zones and determining whether the quiet margin values in each zone are acceptable, restrictions on an amount of skew present in an image can be controlled. In the example of FIG. 2 introduced above, each edge is divided into two zones (top left 205 and top right 210 zones; upper right side 215 and lower right side 220 zones; bottom left 230 and bottom right 225 zones; and upper left side 240 and lower left side 235 zones) and these zones are used to check quiet margins at each edge. The processing of each zone is discussed in greater detailed below with respect to FIG. 5.

In S415, it is determined whether all zones around the edges of the image have been processed. If it is determined at S415 that some zones have not been processed, processing returns to S400. S400, S405, S410 and S415 collectively are an example of the "Determining Image Quality Measures" (S305) of FIG. 3.

After all zones have been determined to be processed at S415, it is determined whether all zones are sufficient (i.e., each zone is determined to have a sufficient quiet margin size) at S420. In some example embodiments, each individual zone is determined to have a sufficient quiet margin size if the quiet margin size is greater than a minimum margin size (for example, 2% of the image height or width). In other example embodiments, each individual zone is determined to have a sufficient margin size if the quiet margin size is greater than or equal to a minimum margin size (for example, 2% of the image height or width) and the quiet margin is less than or equal to a maximum margin size (for example, 8% of the image height or width). S420 is an example of the "Quality Measures are Sufficient" determination (S310) of FIG. 3.

If any zone around the edge is determined to not be sufficient, feedback is provided that edges are insufficient at S430. S430 is an example of the "Provide Feedback on Quality Measures" (S315) of FIG. 3. Processing is then returned to S300 of FIG. 3, a new preliminary image is captured, and the above discussed processes are repeated until all zones around the edges are determined to be sufficient.

If all the zones around the edge are determined to be sufficient, the quiet margin size is determined to be sufficient in S425 and feedback is provided indicating that the edges are sufficient. S425 is an example of "Provide Feedback that All Quality Measures Are Sufficient" (S320) of FIG. 3. Processing may then optionally continue to S325 of FIG. 3 and a final image may be captured and subsequent processing such as OCR may be performed on the captured final image.

FIG. 5 illustrates the method of processing each individual zone during S410 of FIG. 4. Each row or column of pixels in the zone is processed starting at the edge to determine whether the row or column contains all or almost all pixels of a background pixel value (e.g. paper color), except for possibly a few noise pixels, such that the row or column is considered background or contains enough pixels of a foreground pixel value (e.g. text color, diagram, photo) that the row or column is not background only. Each row or column of the zone being analyzed is successively evaluated beginning with the row or column closest to the image edge.

At the beginning analyzing the zone, a row or column counter is set to 0 in S500. This row/column counter is be used to determine the pixel width of the quiet margin. In S505, it is determined whether the background color of the binary image has been previously determined so that the foreground pixel value (e.g. pixel value of text, diagrams or photos printed on the page of the physical document to be captured) can be distinguished from the background pixel value (e.g. pixel value of the blank areas of the page of the physical document to be captured) based on the color.

If the background color of the binary image has not yet been determined, the number of pixels having a pixel value of 0 is counted, and the number of pixels having a pixel value of 1 is counted for the row or column closest to the image edge in S510. The predominant color (i.e. either 1 or 0 which has occurred the most in the row or column) is set as the background color. In S515, it is determined whether the number of the non-predominant pixels (e.g. the number of pixels having a "0" value if the predominant value is determined to be "1" value pixels, or the number of pixels having a "1" value if the predominant value is determined to be "0" value pixels) exceed a threshold.

If the number of non-predominant pixels is determined to not exceed the threshold value, the predominant color is set as the background color in S520. After the predominant color is set as the background color in S520, the row/column counter is incremented (i.e. increased by a value of 1) in S530. Thus, the row/column counter represents a number of successive rows or columns from the outermost edge of the image that is determined to be quiet rows or quiet columns.

After the row/column counter is incremented in S530, the process moves back to S505 where the analysis is repeated for a row or column located further inward of the row or column just analyzed. Thus, in S505, it is again determined whether the background pixel values of the binary image have been previously determined. In some example embodiments, the background and foreground pixel values of the binary image are determined once based on the values of the first quiet row or column and the same background and foreground colors are assumed for successive rows or columns in S520. However, in alternative embodiments, the same background or foreground colors need not be assumed between each row or column, and each row or column may be separately evaluated in S510, S515 and S520 to determine what predominant color is present and a row or column could be considered quiet if most pixels in the row/column have the value associated with background of the page of the physical document.

In example embodiments where the background pixel value for the whole zone is set in S520, the analysis of the further inward row or column proceeds to S525 and it is determined whether the number of foreground pixels (i.e. non-predominant pixels) exceeds the threshold number. This threshold number represents a maximum number of foreground pixels allowed in a row or column and the row or column still be classified as quiet (i.e. a blank row or column). A small number of foreground pixels may be allowed to account for noise that may occur in the margins of the preliminary image.

If the number of foreground pixels is determined to not exceed the threshold in S525, the row or column is determined to be a quiet row or quiet column (i.e. a row or column that may be part of a quiet margin (i.e. a margin is quiet if all the rows/columns in the margin are quiet) and the row/column counter is again incremented (i.e. increased by a value of 1) in S530. Again, the row/column counter represents a number of successive rows or columns from the outermost edge of the image that is determined to be quiet rows or quiet columns. As discussed above, by counting the number of rows or columns that are "blank" (the threshold allows for some noise) or quiet, the size of a quiet margin can be determined.

S505, S525, and S530 are repeated in sequence for successively further inward rows or columns, until the number of foreground pixels is determined to exceed or is equal to (e.g., not less than) the threshold value in S525.

If the number of foreground pixels in a row or column exceeds or is equal to the threshold value, the row or column is determined to not be quiet (i.e. not a "blank" row or column), and the row/column counter is returned indicating the number of rows or columns that were determined to be quiet (i.e. "blank" rows or columns) in S535. The size of the quiet margin is determined as the number of consecutive rows or columns of pixels from an edge that were determined to be quiet ("blank").

If during S515 it is determined that the number of non-predominant pixels is greater than the threshold, the row or column is also determined to not be quiet (i.e. not a "blank" row or column) and the row/column counter is returned indicating the number of rows or columns that were determined to be quiet (i.e. blank rows or columns) in S535. Again, the size of the quiet margin may be determined based on the number of consecutive rows or columns of pixels from an edge that were determined to be quiet (blank) and the size of an individual row or column (e.g. row/column counter value*pixel size=quiet margin size). In some example embodiments, each individual zone is determined to have a sufficient quiet margin size if the quiet margin size is greater than a minimum margin size (for example, 2% of the image height or width). In other example embodiments, each individual zone is determined to have a sufficient margin size if the quiet margin size is greater than or equal to a minimum margin size (for example, 2% of the image height or width) and the quiet margin is less than or equal to a maximum margin size (for example, 8% of the image height or width). In some example embodiments, the computed quiet margins for different edges may have unequal values, such that the area of interest is slightly offset.

As discussed above, after each zone is analyzed to determine the quiet margin size, it is determined in S420 (of FIG. 4) whether all of the zones are acceptable (i.e. the zones have a sufficient quiet margin size). Based on the determination, either a new preliminary image is captured and the process is repeated (S430) or an indication that the image quiet margins are acceptable is provided at S425 and a secondary (i.e. final) image is captured and subsequent post processing, such as an Optical Character recognition (OCR) process can be performed.

Character Location-Based Method

Figure 6:
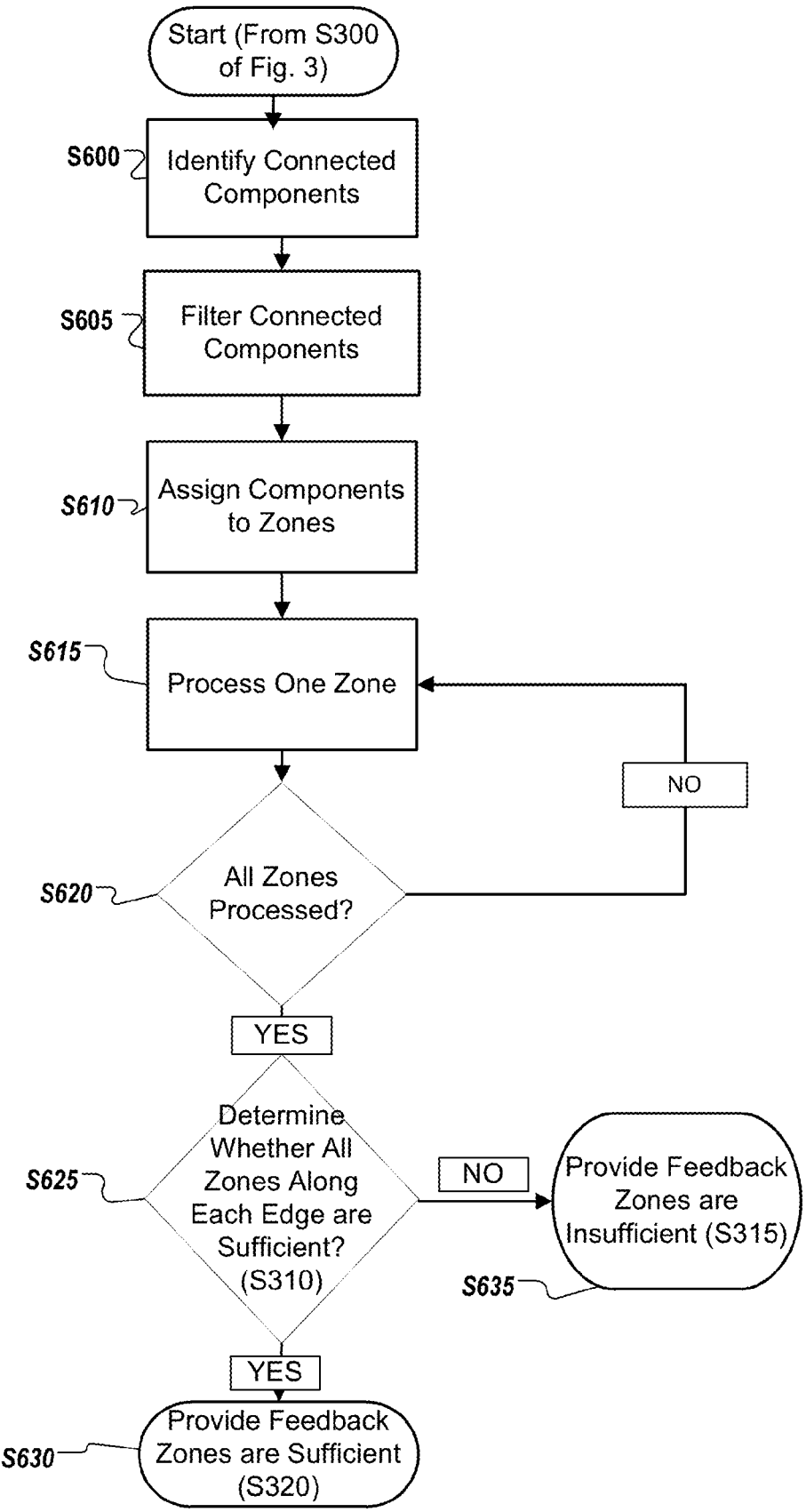
FIG. 6 illustrates a method for processing a whole image using connected components according to an example embodiment.
Figure 7:
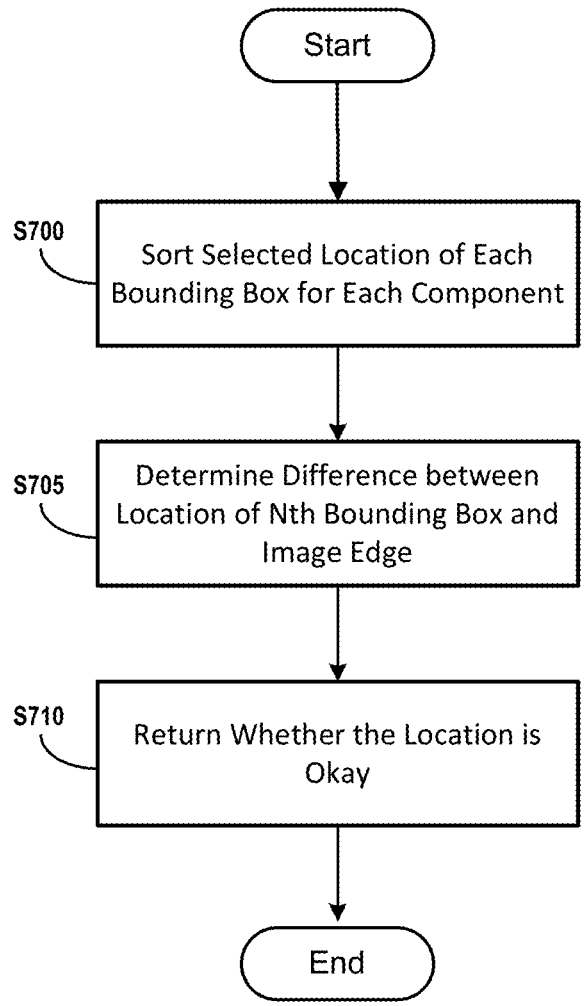
FIG. 7 illustrates a sub-method of processing an individual zone making up a portion of the image in the method of FIG. 6 according to an example embodiment

Block diagrams illustrating an example method of finding quiet margins using character-size connected components as features is shown in FIGS. 6 and 7. FIG. 6 illustrates the method for processing the whole image and provides example embodiments of S305, S310, S315, and S320 of the process of FIG. 3. FIG. 7 illustrates a method of processing an individual zone making up a portion of the image in the method of FIG. 6.

In S600, the image is analyzed to first identify connected components (for example, regions of connected text) using one or more computer vision techniques. For example, computer vision tools from the OpenCV library could be used. However, computer vision techniques are not limited to the OpenCV library and other computer vision techniques could be used to identify connected components as would be apparent to a person of ordinary skill in the art.

After the connected components are identified in S600, the connected components that do not have a size and/or aspect ratio consistent with text characters are filtered out in S605. A location of a box bounding for each connected component that is not filtered out in S605 is computed and assigned into one or more zones for processing in S610. For example, all bounding boxes which have a centroid in the top half of the image may be assigned to the top zone along the left margin, and all bounding boxes which have a centroid in the bottom half of the image may be assigned to the bottom zone along the left margin.

After all bounding boxes that were not filtered out based on size and/or aspect ratio are assigned to one or more zones in S610, each zone is processed to determine margin size in S615 and 620. The processing of each individual zone is discussed in greater detail with reference to FIG. 7 below. In S620, it is determined whether all zones have been processed. S615 is repeated until all zones are processed. S600, S605, S610, S615, and S620 collective are an example of the "Determining Image Quality Measures" (S305) of FIG. 3.

After all zones are processed, it is determined whether all zones are sufficient (i.e. each zone is determined to have a sufficient quiet margin size) at S625. In some example embodiments, each individual zone is determined to have a sufficient quiet margin size if the quiet margin size is greater than a minimum margin size (for example, 2% of the image height or width). In other example embodiments, each individual zone is determined to have a sufficient margin size if the quiet margin size is greater than or equal to a minimum margin size (for example, 2% of the image height or width) and the quiet margin is less than or equal to a maximum margin size (for example, 8% of the image height or width). S625 is an example of the "Quality Measures are Sufficient" determination (S310) of FIG. 3.

If any zone around the edge is determined to not be sufficient, feedback is provided that edges are insufficient at S635. S635 is an example of the "Provide Feedback on Quality Measures" (S315) of FIG. 3. Processing is then returned to S300 of FIG. 3, a new preliminary image is recaptured, and the above discussed processes are repeated until all zones around the edges are determined to be sufficient.

If all the zones around the edge are determined to be sufficient, the quiet margin size is determined to be sufficient in S630 and feedback is provided indicating that the edges are sufficient. S630 is an example of the "Provide Feedback that All Quality Measures Are Sufficient" (S320) of FIG. 3. Processing may then optionally continue to S325 of FIG. 3 and a final image may be captured and subsequent processing such as OCR may be performed on the captured final image.

FIG. 7 illustrates the method of processing each individual zone during S615 of FIG. 6. In S700, the locations of the bounding box of each connected component are sorted. For example, to compute whether a zone in the left margin is sufficient, the values of the bounding boxes in that zone are sorted. In some example embodiments for computing the left margin, a number (N-1) of left most values may be ignored and filtered out as noise if not aligned with at least a certain number of other bounding boxes in a direction roughly parallel to the image edge.

In S705, the margin size of a zone is estimated based on the difference between the location of the edge of the image in the zone (e.g., 0, image width, or image height) and the edge of the bounding box closest to said the image edge in the zone. For example, the difference between the leftmost remaining value not ignored as noise and the left edge of the image may be used to the estimate the size of the left margin. To compensate for non-text regions in some embodiments, the number of characters in the region is determined. If there are fewer characters than a certain minimum number of characters, the bounding box is noted as containing too few characters.

In S710, a margin may be considered sufficient if at least one of the zones associated with the margin is sufficient and the other zones associated with the margin are either also sufficient or have been recorded as containing too few characters. In some example embodiments, each individual zone is determined to have a sufficient quiet margin size if the quiet margin size is greater than a minimum margin size (for example, 2% of the image height or width). In other example embodiments, each individual zone is determined to have a sufficient margin size if the quiet margin size is greater than or equal to a minimum margin size (for example, 2% of the image height or width) and the quiet margin is less than or equal to a maximum margin size (for example, 8% of the image height or width). Though the example embodiments discussed above refer to the left margin, the zones belonging to the right, top and bottom margins may be computed using similar methods.

Any of the above discussed methods for estimating the size of the margins can be combined in different ways. In some embodiments, the framing may be considered sufficient if one or both methods determine that the framing of the whole preliminary image is determined to be sufficient. In other example embodiments, if at least one of the methods considers one zone of an edge sufficient of the preliminary image is considered sufficient, then the whole edge zone is determined to be sufficient. Alternatively, a whole edge may be determined sufficient only if all zones of that edge are determined to be sufficient.

Sharpness Score-Image Sharpness Estimation

Figure 14:
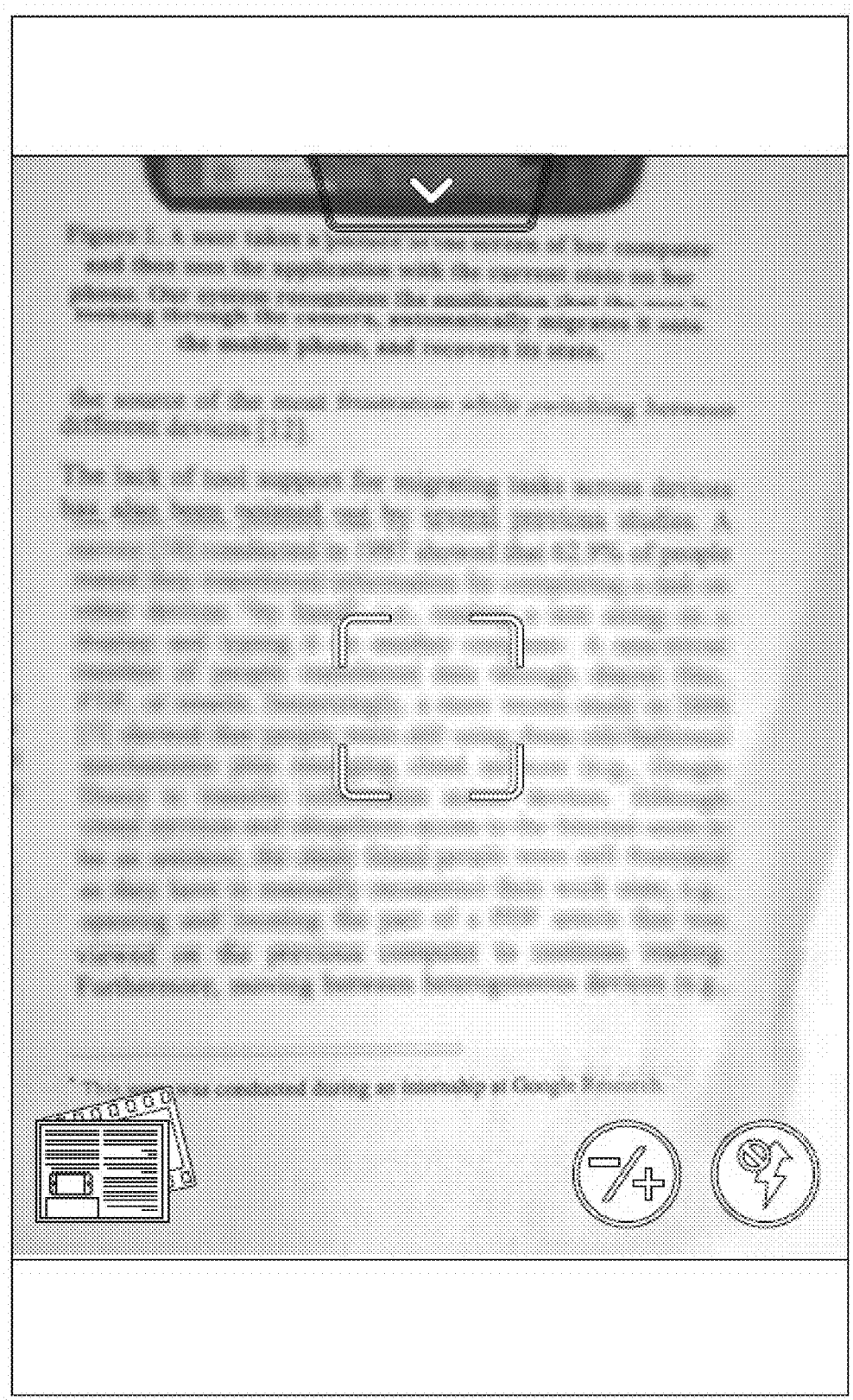
FIG. 14 illustrates an example of a blurry image captured by a mobile device.
Figure 15:
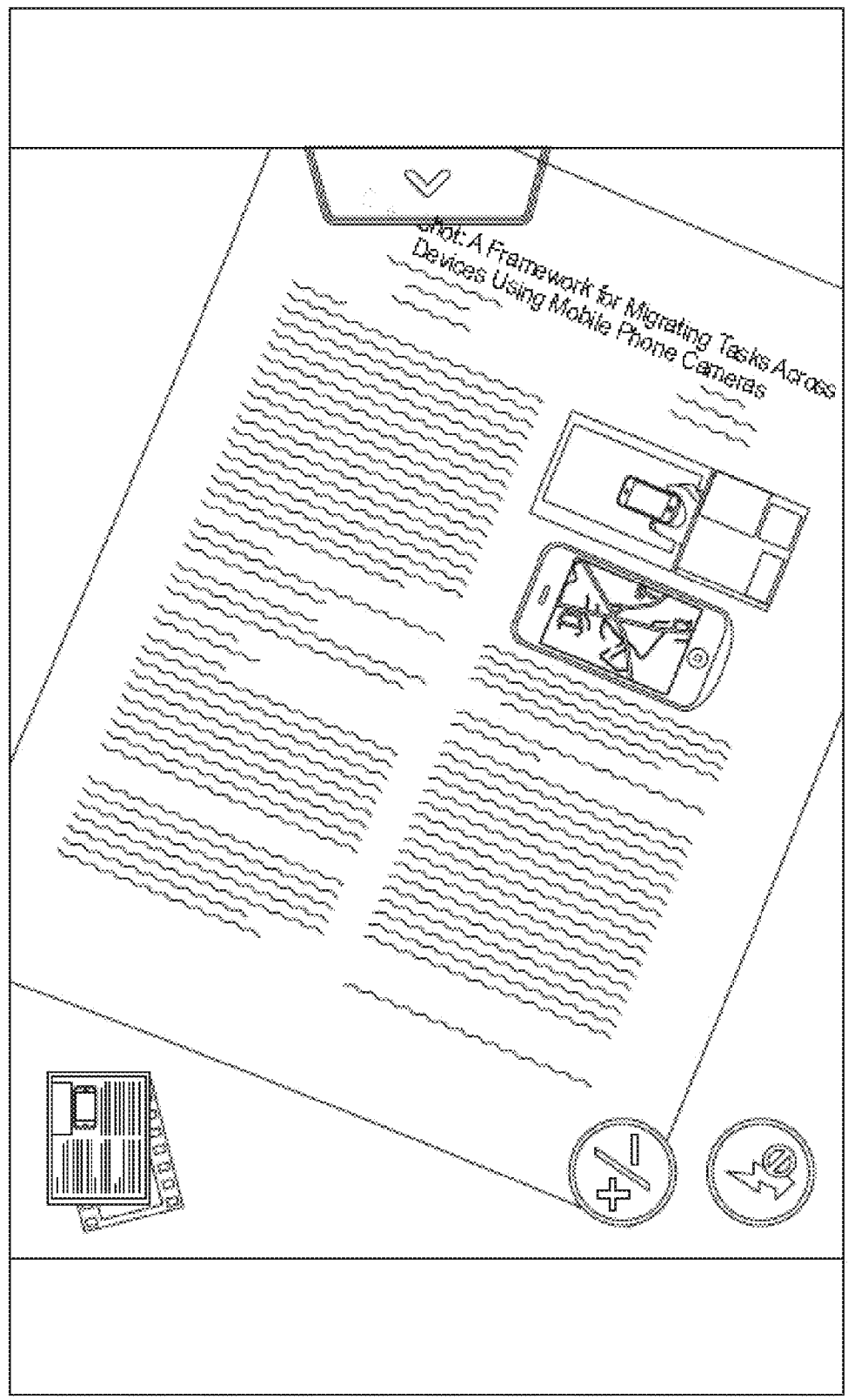
FIG. 15 illustrates an example of a non-aligned image captured by a mobile device.

To produce a quality image, the text in a preview image should not be blurry as shown in FIG. 14. Thus, sharpness may be measured to determine whether the preview image is blurry. The technique used to measure sharpness is not particularly limited. One example technique for measuring sharpness is described in U.S. patent application Ser. No. 13/293,845 (filed on Nov. 10, 2011), which could be used in an example embodiment. This measure was developed for text, but also works for images. Alternative sharpness measuring techniques could be used as would be apparent to a person of ordinary skill in the art.

Some sharpness estimating techniques only involve estimating sharpness in the horizontal direction. The techniques of U.S. patent application Ser. No. 13/293,845 estimate the sharpness of an image in both the vertical and horizontal directions. As text tends to have predominantly vertical and horizontal strokes, the techniques of U.S. patent application Ser. No. 13/293,845 estimate the sharpness more accurately when the text lines are aligned with an edge of the camera image. Thus, document sharpness tends to be greater when text lines are aligned with an edge of a captured image. Techniques estimating sharpness only in a horizontal direction could be used in example embodiments, but stronger feedback regarding text orientation may be provided by estimating sharpness in horizontal and vertical directions.

Combining Quality Measures

The image sharpness and quiet margins measures may be used independently from each other, or may be combined in various ways. In some example embodiments, a first indication may first be provided when the preliminary image is in focus and then a second indication may be provided when the framing is sufficient. In some alternative embodiments, the separate image sharpness and quiet margin measures may be combined into one score (for example, a weighted average may be used).

In some example embodiments, the document sharpness and the quiet margins measures being used in combination as discussed above may address some or all of the document image issues outlined in the background section above.

Focus

The sharpness measure may indicate when autofocus was successful, and may prevent capturing an image when the autofocus refocuses just prior to image capture.

Framing

The narrow quiet margin measures may allow relatively straight framing to be achieved.

Rotation

As discussed above, document sharpness tends to be greater when text lines are aligned with an edge of a captured image. Thus, if a mobile device is rotated relative to a page, the sharpness may not be high. Additionally, the quiet margin constraints may be difficult to satisfy if the text is rotated. Thus, if the document sharpness and quiet margin measures are sufficient, the rotation of the image may be considered sufficient.

Shadows and Poor lighting

When there are shadows over the image or poor lighting, the edges may not be as sharp, and document sharpness measures will be lower. Thus, by ensuring that sharpness measures are sufficient, lighting may be considered sufficient.

Depth Variation

When a user captures an image from the side, both the document sharpness and the quiet margins measures may be insufficient. Thus, if the document sharpness and quiet margin measures are sufficient, the depth variation of the image may be considered sufficiently small.

Using the Methods

Several different example approaches to using the example methods discussed above may be used to capture high quality scans. For example, two approaches, the "hover" approach and the "lift and lower" approaches, are discussed below.

Hover Approach

For mobile devices with autofocus, a user may assume that the mobile device will eventually focus given enough time. Thus, most of the user's attention can be directed to adequately framing the page. By using the image sharpness calculating methods discussed above, an image sharpness indicator can be provided when the image is sharp as the mobile device is moved around by the user attempting to frame the image.

Further, though the camera continuously refocuses, the focus process itself can sometimes take several seconds. Additionally, sometimes the image is blurry even when the camera focus has settled requiring that the mobile device be moved away and back into position, to attempt to cause the mobile device to readjust into a sharper focus. Using an image sharpness indicator may better insure that a captured image will be sharp.

With these issues in mind, a hover approach to scan physical documents using the above sharpness and quiet margin measuring methods is as follows:

The user holds the mobile device approximately over the region of interest, and then waits for the feedback (e.g. audio or video indicators) to indicate that the image is in focus.

As the user slowly adjusts the position of the mobile device, the camera continues to provide sharpness feedback (e.g. audio or video indicators). Once, the text is framed, (e.g., the left and right margins are acceptable), the mobile device will provide further feedback (e.g. different or similar audio or video indicators). Alternatively, the mobile device may automatically capture a final image once the text is framed.

After the final image is taken, the final image is displayed. The user can view an image that fits on the screen, go to the image gallery to view it, continue to take another image using the sharpness and quiet margin measuring techniques, or delete the final image and try taking another image.

In some embodiments, the sharpness measure may be thresholded such that once a minimal level of sharpness is achieved, the sharpness is determined as "sufficient", and the feedback becomes steady. For example, if audio feedback is provided as low-pitched beeps for poor sharpness values and higher-pitched beeps for better sharpness values, the pitch of the beeps will remain high and constant as long as the sharpness is "sufficient". If visual feedback is used, the LED can be colored, e.g., green, to indicate that the image is sharp.

If the pitch is not high and constant, or the LED is not steadily green, either the camera autofocus may be unable to focus and the mobile device may need to be moved away and back so that the camera can try to autofocus again, or there may be a problem with the user's setup. For example, the lighting may be too dark, too much of the image may have shadows, or the text may be very small. With lighting issues, the user may need to either adjust the ambient lighting or move so that the source of the shadow (e.g. the user) is no longer between the light source and the page. In some embodiments, the threshold sharpness value may be adjustable by the user.

Once the image is sharp, the user can focus on adjusting the camera position until the framing is sufficient. With this approach the primary task of the user is to frame the desired text and/or images. While it may be difficult to manually check that two to four sides are correctly aligned simultaneously, a mobile device can recognize when two to four sides are correctly aligned and in some embodiments, a final image is captured automatically. By having the camera automatically capture an image, the user does not need to press a button which can shake or jolt the camera.

Lift and Lower Approach

Another approach to framing content on a page involves either:

Beginning with the mobile device located near the page to be captured and moving the mobile device away from the physical document until a framing feedback indicator indicates adequate framing for sections of the physical document, or Beginning with the mobile device located far from the page and moving the mobile device gradually closer until the mobile device is an appropriate distance from the page to capture of the entire page with appropriate margins.

Figures 9A, 9B, 9C:
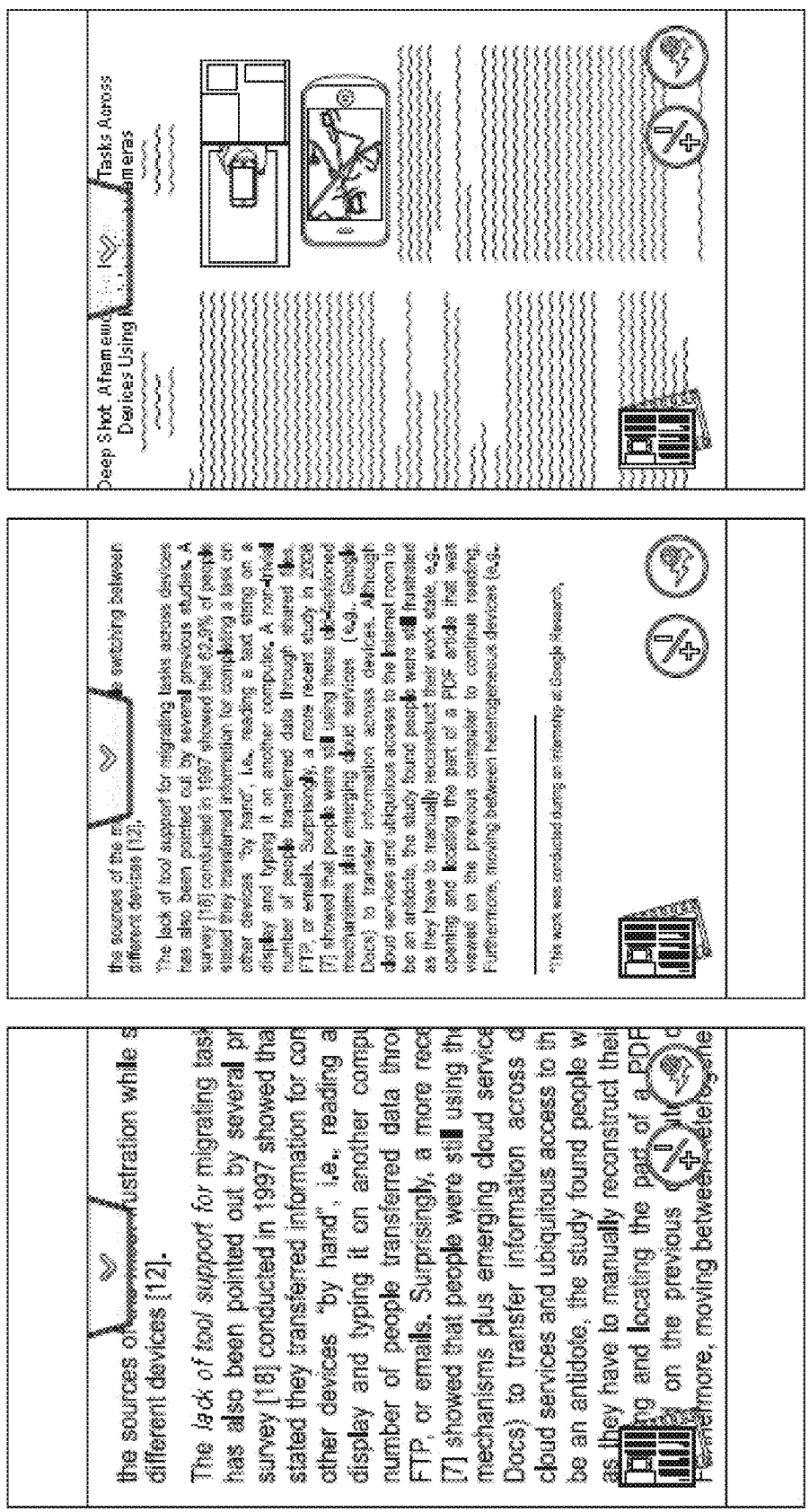
FIGS. 9(a)-(e) illustrate examples of images with various levels of quiet margins or quiet areas as a mobile device is moved relative to a physical document.

FIGS. 9a-9e illustrate five different levels of framing that the captured image goes through as a mobile device is moved either toward or away from the page assuming that the mobile device is aligned with respect to the page:

In FIG. 9a, the mobile device is close to the page and lines of text are cutoff along at least one edge. At this level, feedback indicating that quiet margins are insufficient (negative) may be provided.

In FIG. 9b, the mobile device is further from the page such that a section of the physical document with quiet zones around the section has come into view. At this level, feedback indicating that quiet margins are sufficient (positive) may be provided.

In FIG. 9c, the mobile device is even further from the page such that more sections of the physical document have come into view. Again text lines are cutoff and the feedback indicating that quiet margins are insufficient (negative) may be provided.

Figure 9E:
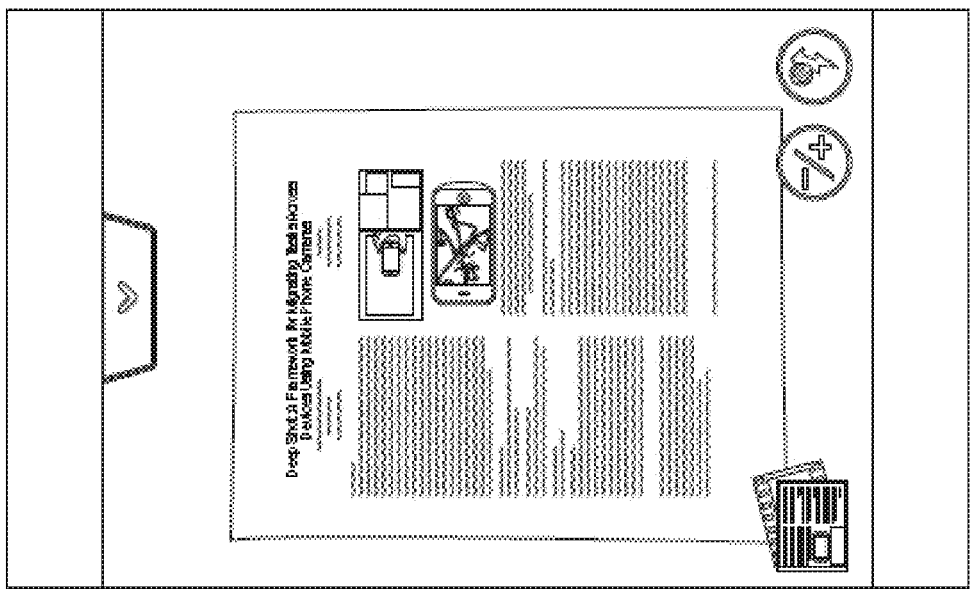
Figure 9D:
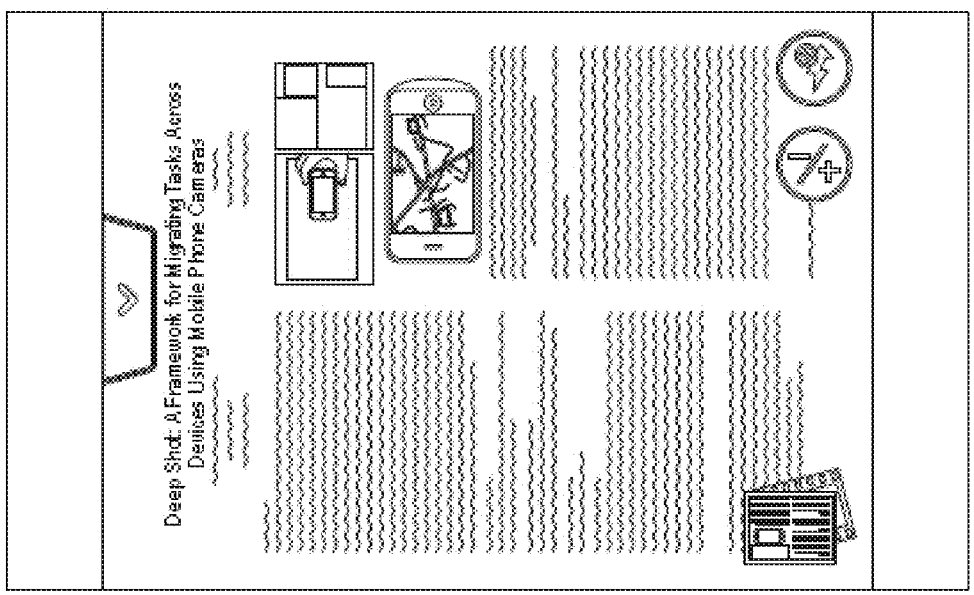

In FIG. 9d, the mobile device is still further from the page such that even more of the physical document had come into view, more quiet zones reappeared, and the feedback that quiet margins are sufficient (positive) may be provided.

In FIG. 9e, the mobile device is even further from the page such that the mobile device's camera can no longer resolve the text, leading to a low sharpness estimate and negative sharpness feedback may be provided.

Thus, when taking a picture of a subsection of the physical document the user can hold the camera close to the section and slowly move the mobile device. Similarly, when taking a picture of the entire document the user can hold the mobile device above the physical document and slowly move the mobile device toward the mobile device (alternatively, the user can use the lift gesture and simply move through the first local maximum). In both cases, assuming sufficient alignment, the predicted image quality should reach a local maximum.

If that local maximum itself is still not high enough that a satisfactory image can be obtained, then the user can try strategies to improve the sharpness of the image, such as moving to better light, leaning away from the physical document so as not to cast a shadow on it, or adjusting the focus thresholds.

As with the "hover" method, after taking a picture, the picture is displayed and the same options are available.

A drawback with this approach is that the user would need to wait for the camera to refocus at each level. However, to address this drawback, the user could optionally adjust settings so that autofocusing of the camera only occurs when manually triggered by the user (e.g. with a button press).

Other Usage Methods

Many other capture methods are possible. For example, when shooting a multi-page document the user could set and lock the focus when capturing the first page and use the "lift and lower" technique to match the capture position of the camera for subsequent pages.

In another example, feedback of only the framing score could be given. When feedback indicates that the framing is sufficient, the user would hold the camera still and push a "button" to tell the camera to autofocus and take a picture.

Alternatively, the camera may use instant autofocus techniques that always maintain focus, so that once the framing is sufficient, a picture can be automatically captured.

Additionally, feedback of only the sharpness score can be used to indicate to a user when the camera is focused for multi-page documents. In this case, the user could frame the image by looking at a viewfinder. An alternative method of framing, such as finding the edges of the page of the physical document, could be employed. For example, techniques of automatically identifying the edges of a business card could be used in example embodiments.

Additional Features

Even though a preview image is sharp, a captured final image is not guaranteed to be sharp. It currently takes long enough to process each frame that by the time capture occurs, the camera may attempt to refocus, or the camera may move or be shaken. To address this, in some example embodiments estimating the sharpness of the captured final image could be done automatically, and if the final image is determined to not be sharp, final images could be continuously captured and processed until a final image of sufficient sharpness is achieved. Another optional alternative is to continuously capture a fixed number of images and selecting the one with the best sharpness score. Another optional alternative is to include the movement feature as one of the features, so that feedback on quality can indicate if there is too much movement. In other words, in an example embodiment, the amount of movement can be measured and, if the amount of movement measured is excessive (i.e. exceeds a movement threshold), feedback indicating that movement is too large to capture a good quality image may be provided.

Sometimes the quality will be poor for one of the previously described factors, and a user will want to capture an image anyway. A slider may be provided to allow the user to adjust the image quality on a menu or the mobile device.

Figure 10:
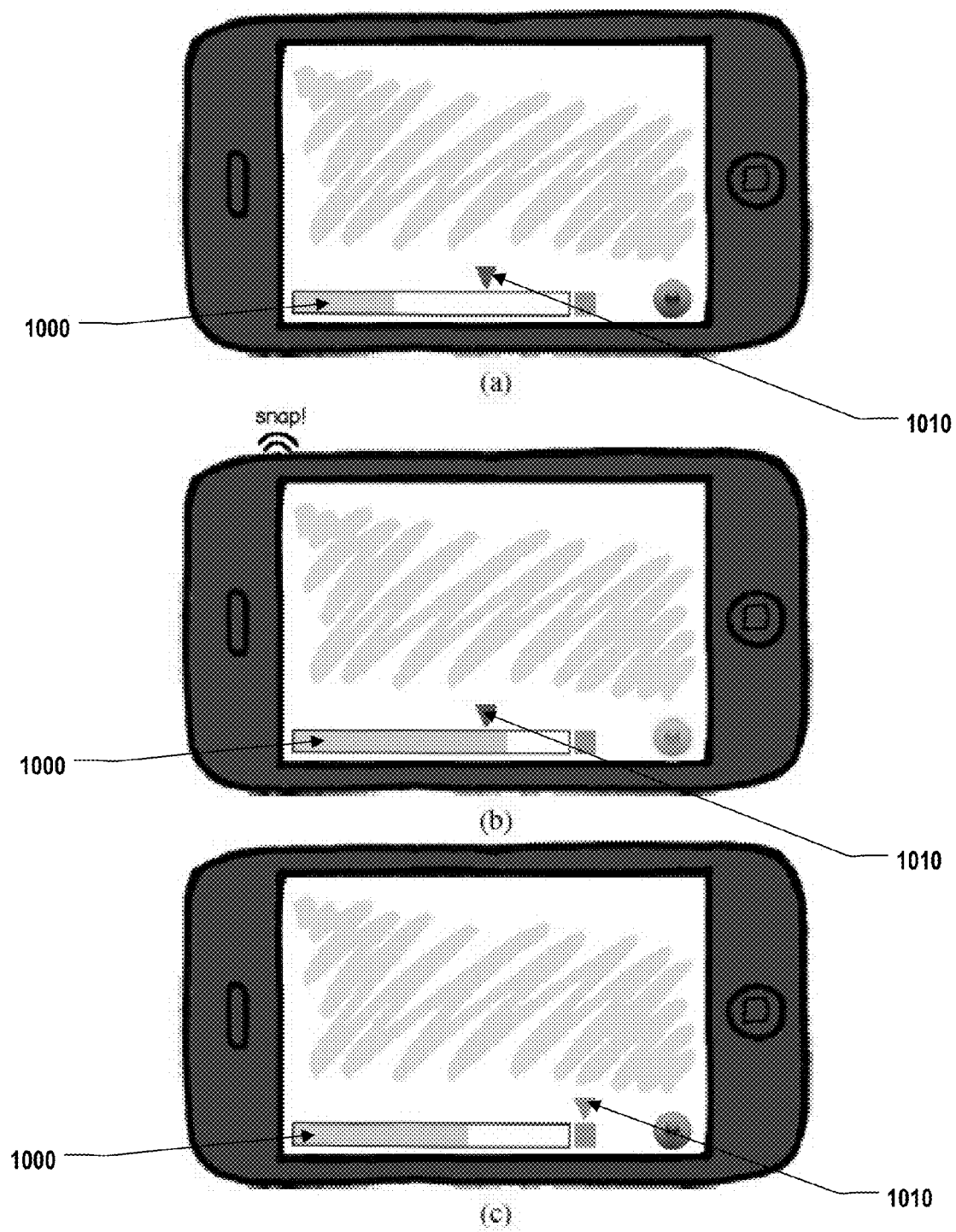
FIG. 10(a)-(c) illustrate an example embodiment of providing visual feedback regarding quality scores of a preliminary image and an interactive slider for adjusting a threshold.

Though examples of audio feedback (e.g. audible tones) and visual feedback (e.g. illuminating LEDs) are discussed above, other ways of providing feedback may be used. For example, visual feedback may be overlaying a feedback bar 1000, graphically indicating a sharpness and/or a framing score, directly on the screen during preview image display as shown in FIGS. 10(a)-10(c). This direct feedback can be coupled with an interactive slider to allow the user to set the threshold 1010 for capturing images automatically. When the sharpness and/or framing exceed the threshold (as shown in FIG. 10c), the image may automatically be captured. Further, if a user moves the threshold icon 1010 to an area beyond the feedback bar 1000, automatic image capture may be effectively turned off, but a user may still capture an image manually.

Figure 11:
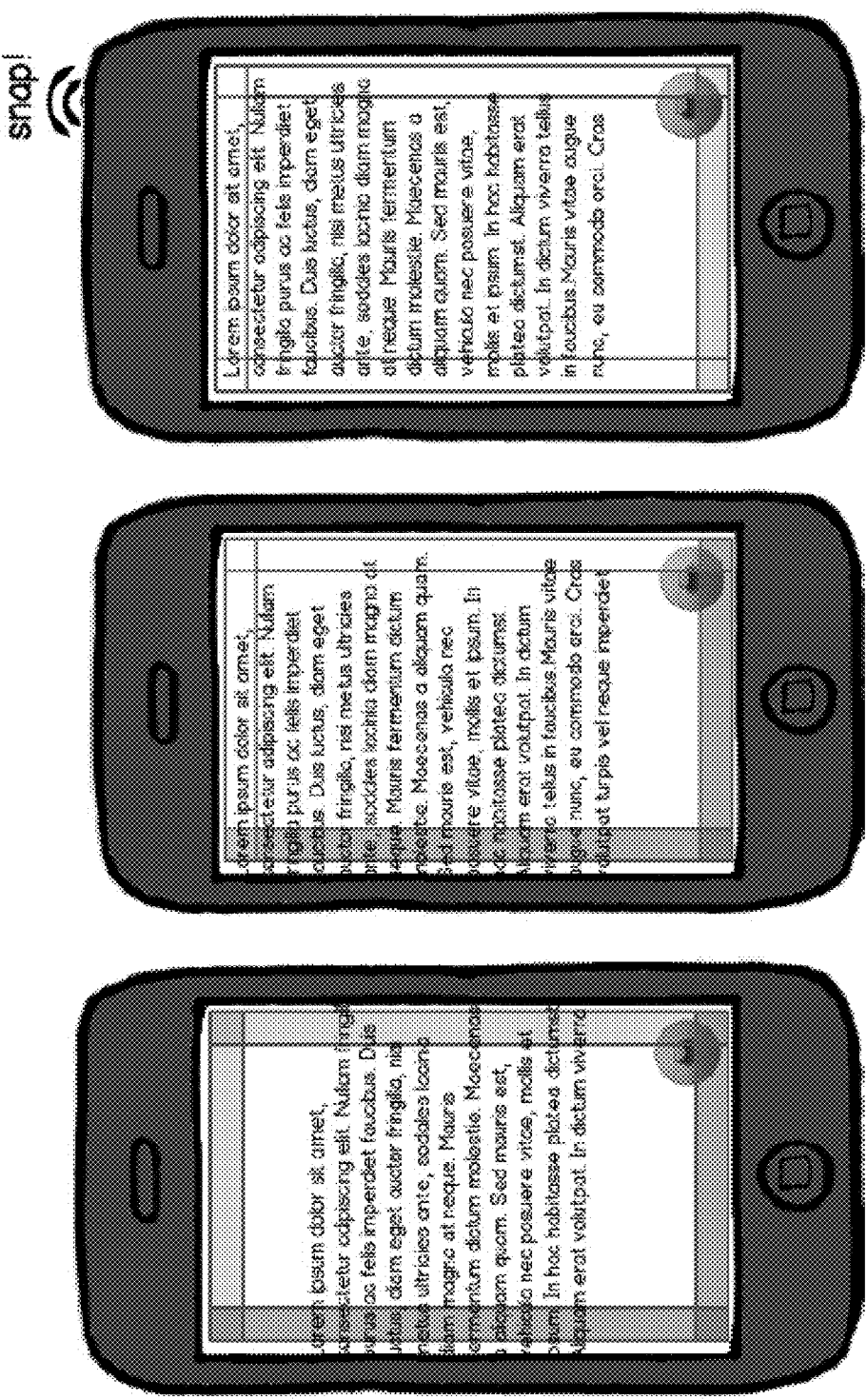
FIGS. 11(a)-(c) illustrate visual feedback for framing a physical document according to an example embodiment.

Additionally, other visual feedback cues could be used to help users improve the image quality score. FIGS. 11(a)-(c) illustrate an alternate interface where visual feedback indicating whether each margin matches the configured constraints, helping the user better frame the physical document, is provided. In FIG. 11(a) margins which do not match configured constraints (i.e. either too big or too small) are shown as greyed out. In FIG. 11(b), the top and right margins are not greyed out as they match configured constraints, but the bottom and left margins remain greyed out because they do not match the configured constraints. In FIG. 11(c), only the bottom margin remains greyed out and an image may be automatically captured because three of the four margins match the configured constraints. Optionally, when an image is captured an audio indicator (for example, a camera shutter sound effect of "snap") or visual indicator (for example, a screen flash) could be provided to inform a user that an image was captured. Though the non-conforming margins are greyed out in this example embodiment, an example embodiment is not limited to the non-conforming margins being greyed out and may include using a different color to highlight the non-conforming margins or may alternatively include highlighting conforming, rather than non-conforming margins, as would be apparent to a person of ordinary skill in the art. Additionally, the non-conforming margins may be represented in other ways. For example, rather than coloring a rectangle the edges of the non-conforming rectangle may be a different color. The color for highlighting may include "transparent"; for example, a conforming margin may "disappear".

Additionally, rather than requiring sufficient quiet margins to occur at three edges, alternative modes may be provided that may allow a user to center the quiet margins, in one direction (for example, horizontally), and requiring sufficiently quiet margins at the edges vertically. In such an embodiment, rather than looking for quiet margins only at the edges, gutters in the center of the page may also need to be identified. This could be done by computing projection profiles and identifying where the values are close to 0 (or 1 if the binary image color is inverted). For example, if pixel features are used, the number of pixels that are 0 could be counted. If characters are used, the bounding box widths/heights in a row/column could be summed, respectively, or the number of bounding boxes that are in a row/column could be counted. To compute a projection profile (one example image analysis method) the pixel values in each column or row are summed (projected). If background pixels are 0, then when the sum is close to 0, there may be a gutter.

Additionally, rather than requiring sufficient quiet margins to occur at three edges, quiet margins along a different number of edges can be required. For example, if only whole pages are to be captured, the quiet margin sizes could be adjusted so that all four edges are required to fall in quiet margins. As other examples, only two quiet margins or no quiet margins may be required in other applications.

Example Computing Devices and Environments

Figure 12:
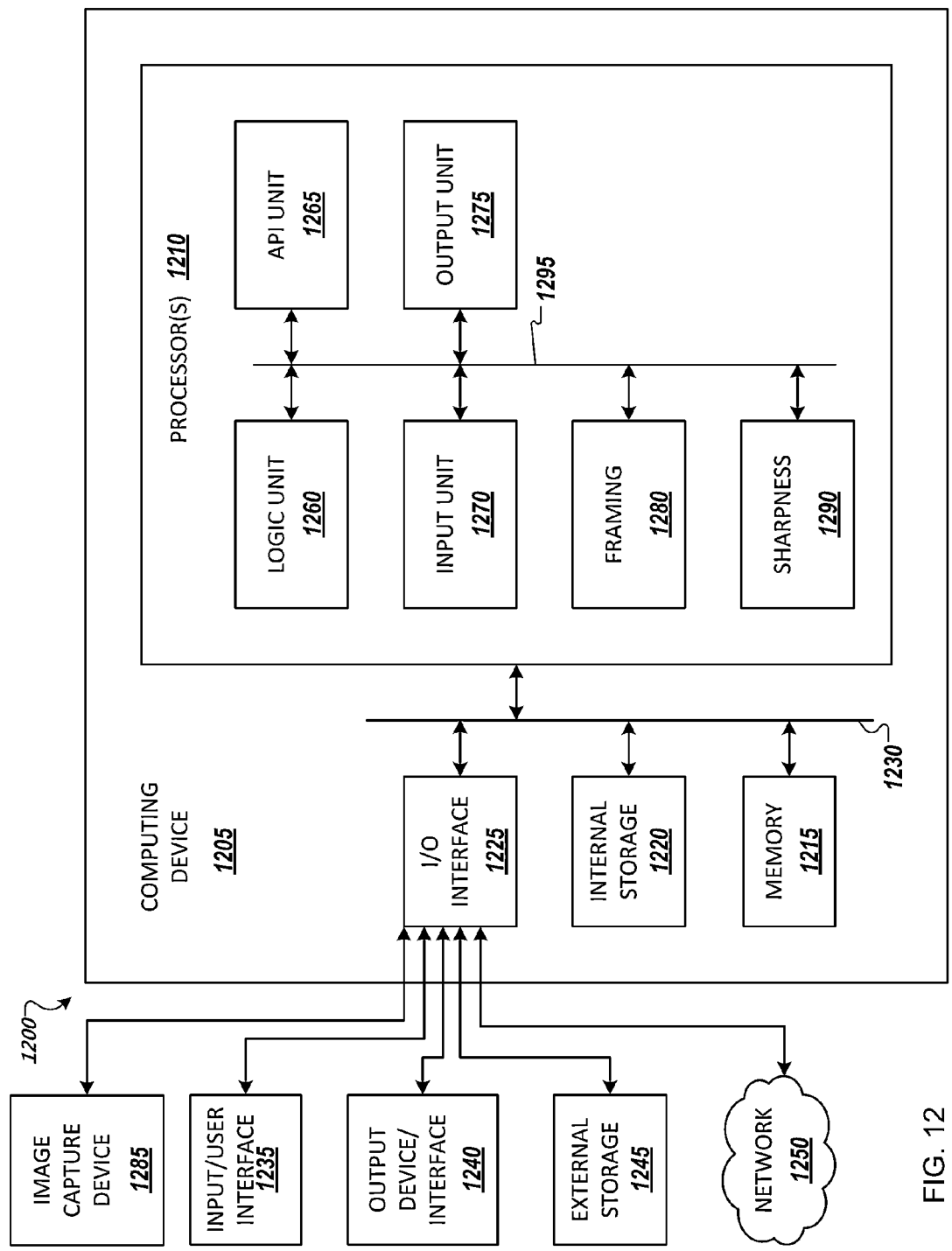
FIG. 12 illustrates an example computing environment with an example computing device suitable for implementing an example embodiment.

FIG. 12 shows an example computing environment with an example computing device suitable for implementing at least one example embodiment. Computing device 1205 in computing environment 1200 can include one or more processing units, cores, or processors 1210, memory 1215 (e.g., RAM, ROM, and/or the like), internal storage 1220 (e.g., magnetic, optical, solid state storage, and/or organic), and I/O interface 1225, all of which can be coupled on a communication mechanism or bus 1230 for communicating information.

Computing device 1205 can be communicatively coupled to input/user interface 1235, output device/interface 1240, and an image capture device 1285. Either one or all of the input/user interface 1235, output device/interface 1240, or image capture device 1285 can be wired or wireless connected and can be detachable. The Input/user interface 1235 may include any device, component, sensor, or interface, physical or virtual, that can be used to provide input (e.g., keyboard, a pointing/cursor control (e.g. a mouse), microphone, camera, braille, motion sensor, optical reader, and/or the like). Output device/interface 1240 may include a display, monitor, printer, speaker, braille, or the like. The image capture device 1285 may include any device, component, or sensor that can be used to capture an image (e.g., camera, motion sensor, optical reader, and/or the like). In some example embodiments, input/user interface 1235 and output device/interface 1240 can be embedded with or physically coupled to the computing device 1205 (e.g., a mobile computing device with buttons or touch-screen input/user interface and an output or printing display, or a television). Additionally, in some example embodiments, the image capture device 1285 may also be embedded with or physically coupled to the computing device 1205 (e.g. a mobile computing device with an integrated camera).

Computing device 1205 can be communicatively coupled to external storage 1245 and network 1250 for communicating with any number of networked components, devices, and systems, including one or more computing devices of same or different configuration. Computing device 1205 or any connected computing device can be functioning as, providing services of, or referred to as a server, client, thin server, general machine, special-purpose machine, or by other label.

I/O interface 1225 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1200. Network 1250 can be any network or combination of networks (e.g., the Internet, local area network, wide area network, a telephonic network, a cellular network, satellite network, and the like).

Computing device 1205 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 1205 can be used to implement techniques, methods, applications, processes, or computer-executable instructions to implement at least one embodiment (e.g., a described embodiment). Computer-executable instructions can be retrieved from transitory media, and stored on and retrieved from non-transitory media. The executable instructions can be originated from one or more of any programming, scripting, and machine languages (e.g., C, C++, C#, Java, Visual Basic, Python, Perl, JavaScript, and others).

Processor(s) 1210 can execute under any operating system (OS) (not shown), in a native or virtual environment. To implement a described embodiment, one or more applications can be deployed that include logic unit 1260, application programming interface (API) unit 1265, input unit 1270, output unit 1275, framing unit 1280, sharpness unit 1290, and inter-unit communication mechanism 1295 for the different units to communicate with each other, with the OS, and with other applications (not shown). For example, the framing unit 1280 and sharpness unit 1290 may implement one or more processes shown in FIGS. 3, 4, 5, 6 and 7. The described units and elements can be varied in design, function, configuration, or implementation and are not limited to the descriptions provided.

Hardware Implementations

Figure 13:
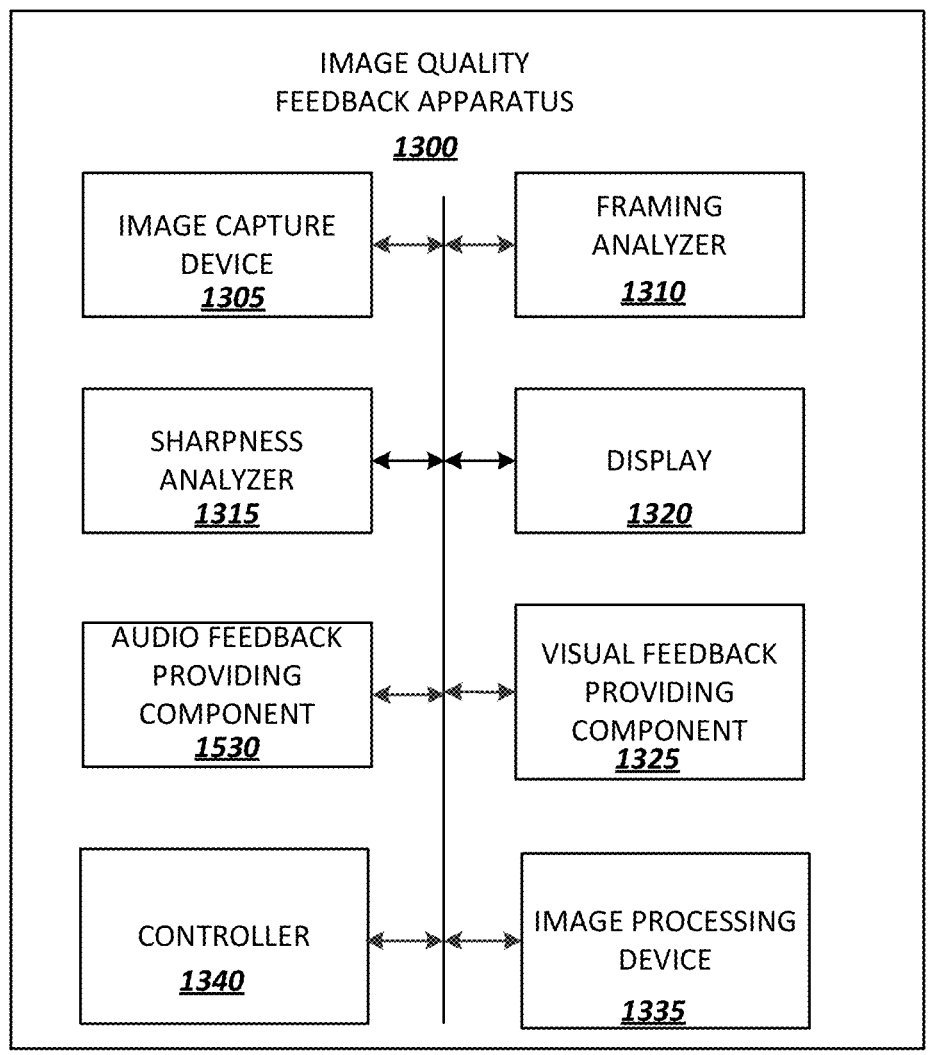
FIG. 13 illustrates an example hardware implementation of an example embodiment.

Though certain embodiments of the present invention may be implemented as software running on, for example, a mobile device, example embodiments are not limited to software implementations. FIG. 13 illustrates an example hardware implementation of an example embodiment.

In FIG. 13, an image quality feedback providing apparatus 1300 is shown. The image quality feedback providing apparatus 1300 may include an image capture device 1305, framing analyzer 1310, controller 1340, and optionally one or more of: a sharpness analyzer 1315, a display 1320, a visual feedback providing component 1325, an audio feedback providing component 1330, and an image processing device 1335, all communicatively interconnected. The image capture device 1305 may include any device, component, or sensor that can be used to capture an image (e.g., camera, motion sensor, optical reader, and/or the like). The framing analyzer 1310 may be configured to detect analyze the framing (for example, the quiet margins) of a captured image using one or more of the processes shown in FIGS. 1, 3, 4, 5 and 6 and discussed above. Similarly, the sharpness analyzer 1315 may analyze the sharpness of a captured image using one or more of the processes discussed above.

Additionally, the display 1320 may be any device or component that can be used display information to a user (e.g. a CRT display, Plasma display, LED display, LCD display, and/or the like) and may be used to provide preliminary images and other information to a user (for example, information regarding state information such as flash settings, f-stop settings, shutter speed settings, lighting levels, and/or the like).

Additionally, the audio feedback providing component 1330 may include any device or component that can be used to provide audio information to a user (e.g. a sound producing device and a speaker, and/or the like) to convey feedback regarding the framing (e.g. quiet margin) and/or sharpness analysis performed by the framing analyzer 1310 and the sharpness analyzer 1315, respectively. Similarly, the visual feedback providing component may include any device or component that can be used to provide visual information to a user (e.g. an LED device, light, second display, or controller for causing the display to provide information, and/or the like) to convey feedback regarding the framing (e.g. quiet margin) and/or sharpness analysis performed by the framing analyzer 1310 and the sharpness analyzer 1315, respectively.

Additionally, the image processing device 1335 may include any device or component that can be used to perform one or more image recognition processes (e.g. Optical Character recognition (OCR) processes, facial recognition processes, object recognition processes, and/or the like) on a captured image and provide the results of the image recognition process or processes to a user.

The controller 1340 may control one or more of the other components (1305-1335) to carry out one or more of the operations discussed above. For example, the controller 1340 may control the display 1320 to display a preliminary image captured by the image capture device 1305 and may determine whether the framing analysis and/or sharpness analysis performed by the framing analyzer 1310 and the sharpness analyzer 1315, respectively, indicate the preliminary image is sufficient for image capture. Further, the controller 1340 may control the audio feedback providing component 1330 and/or the visual feedback providing component 1325 to provide feedback based on the framing analysis and/or sharpness analysis performed by the framing analyzer 1310 and the sharpness analyzer 1315, respectively. The controller 1340 may also control the image capture device 1305 to capture a final image when the framing analysis and/or sharpness analysis performed by the framing analyzer 1310 and the sharpness analyzer 1315, respectively, indicate that the preliminary image is sufficient for image capture. Further, the controller 1340 may control the image processing device 1335 to perform image recognition processes on the final image when the final image is captured by the image capture device.

Additional Example Embodiments

Although a few example embodiments have been shown and described, these example embodiments are provided to convey the subject matter described herein to people who are familiar with this field. It should be understood that the subject matter described herein may be embodied in various forms without being limited to the described example embodiments. The subject matter described herein can be practiced without those specifically defined or described matters or with other or different elements or matters not described. It will be appreciated by those familiar with this field that changes may be made in these example embodiments without departing from the subject matter described herein as defined in the appended claims and their equivalents.

Aspects related to the example embodiment have been set forth in part in the description above, and in part should be apparent from the description, or may be learned by practice of the invention. Aspects of the example embodiment may be realized and attained by means of the elements and combinations of various elements and aspects particularly pointed out in the following detailed description and the appended claims.

It is to be understood that both the foregoing descriptions are exemplary and explanatory only and are not intended to be limiting.

What is claimed is:

1. A computer-implemented method for providing real-time feedback of an estimated quality of a captured final image, the method comprising:
    Obtaining, by a portable image capture device, a preliminary image of a document;
    Calculating, by the at least one computing device, a quality score of the preliminary image;
    In response to the quality score of the preliminary image exceeding a threshold quality value, taking a first action comprising capturing a final image; and
    in response to the quality score of the preliminary image not exceeding the threshold quality value, providing feedback to adjust a distance of the portable image capture device from the document being imaged by portable image capture device,
    Wherein the quality score comprises a framing score, a sharpness score, and a depth variation between the document and a camera that obtains the preliminary image of the document,
    Wherein the framing score is calculated by measuring a size of a quiet margin in a plurality of zones by using a pixel based technique and a character location technique, and
    Wherein the sharpness score is calculated in at least one of a vertical and a horizontal direction.

2. The method according to claim 1, wherein the calculating comprises calculating, by the at least one computing device, a size of a quiet margin comprising a blank area along an edge of the preliminary image; and
    wherein the framing score exceeds the threshold quality value when the quiet margin size is greater than or equal to a minimum margin size and the quiet margin size is not less than or equal to a maximum margin size.

3. The method according to claim 2, wherein the size of the quiet margin of the edge of the preliminary image is calculated, by the at least one computing device, based on pixel values in an edge zone of the preliminary image.

4. The method according to claim 2, wherein the size of the quiet margin of the edge of the preliminary image is calculated, by the at least one computing device, using the character location technique to locate character-size connected components along the edge zone of the preliminary image.

5. The method according to claim 1, further comprising:
    in response to the sharpness score of the preliminary image exceeding a threshold sharpness value, taking a second action; and
    in response to both the framing score of the preliminary image exceeding the threshold framing value and the sharpness score of the preliminary image exceeding the threshold sharpness value, taking a third action.

6. The method according to claim 1, further comprising, in response to the quality score of the preliminary image not exceeding a threshold quality value obtaining, a new preliminary image and calculating a quality score of the new preliminary image.

7. The method according to claim 6, further comprising at least one of:
continuously obtaining a plurality of final images until a quality score of one of the plurality of final images exceeds the threshold quality value;
obtaining the plurality of final images and selecting as the captured final image the final image having the highest quality score; and
detecting motion of an image capture device during the obtaining of the preliminary image, and providing movement feedback when the motion exceeds a movement threshold.

8. A non-transitory computer-readable medium having stored therein executable instructions for providing real-time feedback of an estimated quality of a captured final image, the instructions comprising:
Obtaining, by a portable image capture device, a preliminary image of a document;
Calculating a quality score of the preliminary image;
in response to the quality score of the preliminary image exceeding a threshold quality value taking a first action comprising capturing a final image; and
in response to the quality score of the preliminary image not exceeding the threshold quality value, providing feedback to adjust a distance of the portable image capture device from the document being imaged by portable image capture device,
Wherein the quality score comprises a framing score, a sharpness score and a depth variation between the document and a camera that obtains the preliminary image of the document,
Wherein the framing score is calculated by measuring a size of a quiet margin in a plurality of zones by using a pixel based technique and a character location technique, and
Wherein the sharpness score is calculated in at least one of a vertical and a horizontal direction.

9. The non-transitory computer-readable medium according to claim 8, wherein the calculating comprises calculating a size of a quiet margin comprising a blank area along an edge of the preliminary image; and
wherein the framing score exceeds the threshold framing value when the quiet margin size is greater than or equal to a minimum margin size and the quiet margin size is not less than or equal to a maximum margin size.

10. The non-transitory computer-readable medium according to claim 9, wherein the size of the quiet margin of the edge of the preliminary image is calculated based on pixel values in an edge zone of the preliminary image.

11. The non-transitory computer-readable medium according to claim 9, wherein the size of the quiet margin of the edge of the preliminary image is calculated using the character location technique to locate character-size connected components along the edge zone of the preliminary image.

12. The non-transitory computer-readable medium according to claim 8, further comprising:
in response to the sharpness score of the preliminary image exceeding a threshold sharpness value, taking a second action; and
in response to both the framing score of the preliminary image exceeding the threshold framing value and the sharpness score of the preliminary image exceeding the threshold sharpness value, taking a third action.

13. The non-transitory computer-readable medium according to claim 8, further comprising, in response to the quality score of the preliminary image not exceeding a threshold quality value, obtaining a new preliminary image and calculating a quality score of the new preliminary image.

14. The non-transitory computer-readable medium according to claim 13, further comprising at least one of:
continuously obtaining a plurality of final images until a quality score of one of the plurality of final images exceeds the threshold quality value;
obtaining the plurality of final images and selecting as the captured final image the final image having the highest quality score; and
detecting motion of an image capture device during the obtaining of the preliminary image, and providing movement feedback when the motion exceeds a movement threshold.

15. An apparatus for providing real-time feedback of an estimated quality of a captured final image, the apparatus comprising:
An image obtaining device that obtains a preliminary image of a document;
A quality analyzer that calculates a quality score of the preliminary image; and
a controller that takes a first action in response to the quality score of the preliminary image exceeding a threshold quality value, and that provides feedback to adjust a distance of the image obtaining device from the document being imaged in response to the quality score of the preliminary image not exceeding the threshold quality value,
Wherein the first action comprises causing the image obtaining device to obtain the final image, and
Wherein the quality analyzer comprises a framing analyzer that calculates a framing score and a sharpness analyzer that calculates sharpness score of the preliminary image,
Wherein the quality analyzer determines depth variation between the document and the image obtaining device that obtains the preliminary image of the document based on the framing score and the sharpness score,
Wherein the framing analyzer that calculates the framing score by measuring a size of a quiet margin in a plurality of zones by using a pixel based technique and a character location technique, and
Wherein the sharpness analyzer calculates the sharpness score in at least one of a vertical and a horizontal direction.

16. The apparatus according to claim 15, wherein the framing analyzer calculates the framing score of the preliminary image by calculating a size of a quiet margin comprising a blank area along an edge of the preliminary image; and
wherein controller determines the framing score exceeds the threshold framing value when the quiet margin size is greater than or equal to a minimum margin size and the quiet margin size is not less than or equal to a maximum margin size.

17. The apparatus according to claim 16, wherein the size of the quiet margin of the edge of the preliminary image is calculated, by the controller, based on pixel values in the edge zone of the preliminary image.

18. The apparatus according to claim 16, wherein the size of the quiet margin of the edge of the preliminary image is calculated, by the controller, using the character location technique to locate character-size connected components along the edge zone of the preliminary image.

19. The apparatus according to claim 15, further comprising:
- wherein the controller takes a second action in response to the sharpness score of the preliminary image exceeding a threshold sharpness value, and
- wherein the controller takes a third action in response to both the framing score of the preliminary image exceeding the threshold framing value and the sharpness score of the preliminary image exceeding the threshold sharpness value.

20. The apparatus according to claim 15, wherein, in response to the quality score of the preliminary image not exceeding a threshold quality value, the controller controls the image obtaining device to obtain a new preliminary image and the controller controls the quality analyzer to calculate a quality score of the new preliminary image.

21. The apparatus according to claim 20, further comprising at least one of:
- the controller controls the image obtaining device to continuously obtain a plurality of final images until a quality score of one of the plurality of final images exceeds the threshold quality value;
- the controller controls the image obtaining device to obtain the plurality of final images and selecting as the captured final image the final image having the highest quality score; and
- a motion detector that detects motion of an image capture device during obtaining of the preliminary image, and the controller provides movement feedback when the motion exceeds a movement threshold.

* * * * *